United States Patent
Nogami et al.

(10) Patent No.: US 9,692,572 B2
(45) Date of Patent: *Jun. 27, 2017

(54) TERMINAL, BASE STATION, COMMUNICATIONS SYSTEM, AND COMMUNICATION METHOD FOR ALLOCATING HYBRID AUTOMATIC REPEAT REQUEST ACKNOWLEDGE RESOURCE USING CONTROL CHANNEL

(75) Inventors: Toshizo Nogami, Osaka (JP); Shoichi Suzuki, Osaka (JP); Tatsushi Aiba, Osaka (JP); Daiichiro Nakashima, Osaka (JP); Katsunari Uemura, Osaka (JP); Kazuyuki Shimezawa, Osaka (JP); Kimihiko Imamura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 268 days.

This patent is subject to a terminal disclaimer.

(21) Appl. No.: 14/233,928

(22) PCT Filed: Jul. 19, 2012

(86) PCT No.: PCT/JP2012/068339
§ 371 (c)(1),
(2), (4) Date: Jan. 21, 2014

(87) PCT Pub. No.: WO2013/015195
PCT Pub. Date: Jan. 31, 2013

(65) Prior Publication Data
US 2014/0133452 A1    May 15, 2014

(30) Foreign Application Priority Data
Jul. 22, 2011 (JP) .............................. 2011-160594

(51) Int. Cl.
*H04L 5/00* (2006.01)
*H04L 1/18* (2006.01)
(Continued)

(52) U.S. Cl.
CPC .......... *H04L 5/0053* (2013.01); *H04L 1/1861* (2013.01); *H04L 5/0091* (2013.01);
(Continued)

(58) Field of Classification Search
CPC ... H04L 5/0055; H04L 5/0053; H04L 1/1861; H04L 1/1896; H04L 1/1812;
(Continued)

(56) References Cited

U.S. PATENT DOCUMENTS 8,902,786 B2 * 12/2014 Nam ................. H04W 72/0406
370/252
2009/0303956 A1    12/2009 Chen et al.
(Continued)

FOREIGN PATENT DOCUMENTS

EP    2 302 830 A2    3/2011
EP    2 381 735 A1    10/2011
(Continued)

OTHER PUBLICATIONS

Huawei et al., "Investigation on Downlink Control Channel and Signaling Enhancements", 3GPP TSG RAN WG1 Meeting #65, R1-111253, May 9-13, 2011, 3 pages.
(Continued)

*Primary Examiner* — Dung B Huynh
(74) *Attorney, Agent, or Firm* — Keating & Bennett, LLP

(57) ABSTRACT

A terminal that communicates with a base station monitors a physical downlink control channel allocated in a physical downlink control channel region and an enhanced physical downlink control channel allocated in a physical downlink shared channel region different from the physical downlink
(Continued)

control channel region. If the enhanced physical downlink control channel is detected, the terminal reports response information via a physical uplink control channel resource corresponding to the resource in which the enhanced physical downlink control channel was detected.

10 Claims, 23 Drawing Sheets

(51) Int. Cl.
*H04W 72/00* (2009.01)
*H04W 88/02* (2009.01)
*H04W 88/08* (2009.01)
*H04J 13/00* (2011.01)

(52) U.S. Cl.
CPC .......... *H04J 13/0059* (2013.01); *H04W 72/00* (2013.01); *H04W 88/02* (2013.01); *H04W 88/08* (2013.01)

(58) Field of Classification Search
CPC .............. H04L 5/0091; H04W 72/042; H04W 72/0413; H04W 72/0406; H04W 72/0446; H04W 72/04; H04W 72/14; H04W 88/02; H04W 88/08; H04J 13/0059
See application file for complete search history.

(56) References Cited

U.S. PATENT DOCUMENTS

| | | | |
|---|---|---|---|
| 2010/0260116 A1 | 10/2010 | Imamura et al. | |
| 2011/0268062 A1* | 11/2011 | Ji | H04J 11/005 370/329 |
| 2011/0274066 A1* | 11/2011 | Tee | H04L 5/001 370/329 |
| 2012/0039285 A1* | 2/2012 | Seo | H04L 1/1671 370/329 |
| 2012/0320846 A1* | 12/2012 | Papasakellariou | H04W 72/042 370/329 |
| 2012/0320847 A1* | 12/2012 | Nam | H04W 72/0406 370/329 |
| 2012/0320848 A1* | 12/2012 | Chen | H04L 5/0055 370/329 |
| 2012/0329468 A1* | 12/2012 | Chmiel | H04L 5/0007 455/450 |
| 2013/0039284 A1* | 2/2013 | Marinier | H04L 5/001 370/329 |
| 2013/0128857 A1 | 5/2013 | Nakao | |
| 2014/0016596 A1* | 1/2014 | Kim | H04L 5/001 370/329 |
| 2014/0029573 A1* | 1/2014 | Lee | H04W 72/1289 370/331 |
| 2014/0064235 A1* | 3/2014 | Seo | H04L 5/0048 370/329 |
| 2014/0071929 A1* | 3/2014 | Seo | H04L 5/0085 370/329 |
| 2014/0086189 A1 | 3/2014 | Takeda et al. | |
| 2014/0119317 A1* | 5/2014 | Kim | H04L 5/0023 370/329 |
| 2014/0153532 A1* | 6/2014 | Nogami | H04L 5/00 370/329 |
| 2014/0192753 A1* | 7/2014 | Jang | H04L 5/0094 370/329 |
| 2014/0211732 A1* | 7/2014 | Nogami | H04L 5/001 370/329 |

FOREIGN PATENT DOCUMENTS

| | | |
|---|---|---|
| JP | 2012-235353 A | 11/2012 |
| WO | 2010/053984 A2 | 5/2010 |
| WO | 2012/029246 A1 | 3/2012 |

OTHER PUBLICATIONS

Nogami, T. et al.; "Terminal, Base Station, Communications System, and Communication Method;" U.S. Appl. No. 14/233,934, filed Jan. 21, 2014.

Official Communication issued in International Patent Application No. PCT/JP2012/068339, mailed on Sep. 4, 2012.

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.2.0, Jun. 2011, 103 pages.

"3rd Generation Partnership Project; Technical Specification Group Radio Access Network; Evolved Universal Terrestrial Radio Access (E-UTRA); Physical layer procedures (Release 10)", 3GPP TS 36.213 V10.2.0, Jun. 2011, 120 pages.

* cited by examiner

FIG. 7

UPLINK CONTROL CHANNEL LOGICAL RESOURCES

| $n_{PUCCH}$ | ORTHOGONAL CODE | CYCLIC SHIFT | m |
|---|---|---|---|
| 0 | OC0 | CS0 | $N_{F2}$ |
| 1 | OC1 | CS0 | $N_{F2}$ |
| 2 | OC2 | CS0 | $N_{F2}$ |
| 3 | OC0 | CS2 | $N_{F2}$ |
| 4 | OC1 | CS2 | $N_{F2}$ |
| 5 | OC2 | CS2 | $N_{F2}$ |
| ⋮ | ⋮ | ⋮ | ⋮ |
| 15 | OC0 | CS10 | $N_{F2}$ |
| 16 | OC1 | CS10 | $N_{F2}$ |
| 17 | OC2 | CS10 | $N_{F2}$ |
| 18 | OC0 | CS0 | $N_{F2}+1$ |
| 19 | OC1 | CS0 | $N_{F2}+1$ |
| 20 | OC2 | CS0 | $N_{F2}+1$ |
| ⋮ | ⋮ | ⋮ | ⋮ |

| SLOT NUMBER | $N_D$ |
|---|---|
| EVEN NUMBER (FIRST SLOT) | A |
| ODD NUMBER (SECOND SLOT) | B |

TERMINAL, BASE STATION, COMMUNICATIONS SYSTEM, AND COMMUNICATION METHOD FOR ALLOCATING HYBRID AUTOMATIC REPEAT REQUEST ACKNOWLEDGE RESOURCE USING CONTROL CHANNEL

TECHNICAL FIELD

The present invention relates to a terminal, base station, communications system, and communication method.

BACKGROUND ART

In wireless communications systems such as Long Term Evolution (LTE) and LTE-Advanced (LTE-A) defined by Third Generation Partnership Project (3GPP), wireless LAN defined by The Institute of Electrical and Electronics engineers (IEEE), and Worldwide Interoperability for Microwave Access (WiMAX), a base station (a base station device, downlink transmitting device, uplink receiving device, eNodeB) and a terminal (terminal device, mobile station device, downlink receiving device, uplink transmitting device, UE) include multiple transmit/receive antennas and use multi-input multi-output (MIMO) technology to spatially multiplex data signals and achieve high-speed data communications. In LTE and LTE-A in particular, the orthogonal frequency division multiplexing (OFDM) scheme is employed in the downlink to achieve high spectral efficiency and the single carrier-frequency division multiple access (SC-FDMA) scheme is used in the uplink to reduce peak power. Furthermore, hybrid ARQ (HARQ), which combines automatic repeat request (ARQ) with error correction codes, has been adopted.

FIG. 25 shows a configuration of an LTE communications system implementing HARQ. In FIG. 25, a base station 2501 notifies a terminal 2502 of control information associated with downlink transmit data 2504 over a physical downlink control channel (PDCCH) 2503. The terminal 2502 first performs detection of control information. If control information is detected, the terminal 2502 uses it to extract downlink transmit data 2504. After detecting the control information, the terminal 2502 reports HARQ response information indicating whether the downlink transmit data 2504 has been successfully extracted or not to the base station 2501 over a physical uplink control channel (PUCCH) 2505. Here, a resource for the PUCCH 2505 (PUCCH resource) available for the terminal 2502 is implicitly/tacitly and uniquely determined by the resource for the PDCCH 2503 to which the control information is assigned. The terminal 2502 thus can use a dynamically assigned PUCCH resource when reporting HARQ response information. It is also possible to prevent overlap of PUCCH resources among terminals (see Non Patent Literatures 1 and 2).

CITATION LIST

Non Patent Literature

NPL 1: 3rd Generation Partnership Project; Technical Specification Group Radio Access Network; Evolved Universal Terrestrial Radio Access (E-UTRA); Physical Channels and Modulation (Release 10), June 2011, 3GPP TS 36.211 V10.2.0 (2011 June)

NPL 2: 3rd Generation Partnership Project; Technical Specification Group Radio Access Network; Evolved Universal Terrestrial Radio Access (E-UTRA); Physical layer procedures (Release 10), June 2011, 3GPP TS 36.213 V10.2.0 (2011 June)

SUMMARY OF INVENTION

Technical Problem

In order to increase the number of terminals that can be covered by a base station in a wireless communications system capable of HARQ, enhanced physical downlink control channel can be used in addition to physical downlink control channel. With the conventional scheme for specifying physical uplink control channel resources, physical uplink control channel resources cannot be specified between the base station and the terminal when a base station transmits control information over an enhanced physical downlink control channel, which hampers improvement in transmission efficiency.

The present invention has been made in view of the problem, and an object thereof is to provide a base station, terminal, communications system, and communication method for, in a wireless communications system in which a base station and a terminal communicates with each other, allowing physical uplink control channel resources to be efficiently specified even in a case where the base station notifies the terminal of control information not only over a physical downlink control channel but an enhanced physical downlink control channel.

Solution to Problem (1) According to an aspect of the invention, there is provided a terminal that communicates with a base station, the terminal including: a downlink control channel detecting unit that monitors a physical downlink control channel allocated in a physical downlink control channel region and an enhanced physical downlink control channel allocated in a physical downlink shared channel region different from the physical downlink control channel region; a data extracting unit that, if the downlink control channel detecting unit has detected the enhanced physical downlink control channel, extracts transmit data on a physical downlink shared channel associated with the detected enhanced physical downlink control channel; a response information generating unit that generates response information for the extracted transmit data; an uplink control channel generating unit that generates a physical uplink control channel by mapping the response information to a physical uplink control channel resource corresponding to an enhanced physical downlink control channel resource in which the enhanced physical downlink control channel was detected; and a response transmitting unit that transmits a signal including the physical uplink control channel.

(2) The uplink control channel generating unit included in the terminal according to an aspect of the invention generates a physical uplink control channel by mapping the response information to a physical uplink control channel resource which is determined based on an index of the enhanced physical downlink control channel resource and an individual shift value configured individually for each terminal.

(3) The terminal according to an aspect of the invention further includes a higher layer control information acquiring unit that acquires control information including a parameter indicating an individual shift value configured individually for each terminal, wherein the uplink control channel generating unit generates a physical uplink control channel by mapping the response information to a physical uplink control channel resource which is determined by adding the individual shift value to an index of the enhanced physical downlink control channel resource.

(4) The higher layer control information acquiring unit included in the terminal according to an aspect of the invention acquires control information including a parameter indicating a common shift value configured in common for all terminals, and the uplink control channel generating unit generates a physical uplink control channel by mapping the response information to the physical uplink control channel resource that has an index of a value obtained by adding the individual shift value and the common shift value to the index of the enhanced physical downlink control channel resource.

(5) The uplink control channel generating unit included in the terminal according to an aspect of the invention generates a physical uplink control channel by mapping the response information to a physical uplink control channel resource which is determined by adding an individual shift value configured for a slot in which the enhanced physical downlink control channel was detected to an index of the enhanced physical downlink control channel resource.

(6) The terminal according to an aspect of the invention further includes a higher layer control information acquiring unit that acquires control information including a parameter indicating a plurality of individual shift values configured individually for each terminal, wherein the downlink control channel detecting unit extracts one of the plurality of individual shift values which is indicated by the detected enhanced physical downlink control channel, and wherein the uplink control channel generating unit generates a physical uplink control channel by mapping the response information to a physical uplink control channel resource which is determined by adding the extracted individual shift value to the index of the enhanced physical downlink control channel resource.

(7) According to an aspect of the invention, there is provided a base station that communicates with a terminal, the base station including: a physical control information notification unit that notifies the terminal of an enhanced physical downlink control channel allocated in a physical downlink shared channel region; and a response information receiving unit that extracts a physical uplink control channel to which response information for transmit data on a physical downlink shared channel associated with the enhanced physical downlink control channel is mapped, from a physical uplink control channel resource corresponding to an enhanced physical downlink control channel resource in which the enhanced physical downlink control channel was allocated.

(8) The response information receiving unit included in the base station according to an aspect of the invention extracts the physical uplink control channel from a physical uplink control channel resource which is determined based on the index of the enhanced physical downlink control channel resource and an individual shift value configured individually for each terminal.

(9) The base station according to an aspect of the invention further includes a higher layer control information notification unit that notifies the terminal of control information including a parameter indicating an individual shift value configured individually for each terminal, wherein the response information receiving unit extracts the physical uplink control channel from a physical uplink control channel resource which is determined by adding the individual shift value to an index of the enhanced physical downlink control channel resource.

(10) The higher layer control information notification unit included in the base station according to an aspect of the invention broadcasts control information including a parameter indicating a common shift value configured in common for all terminals, and the response information receiving unit extracts the physical uplink control channel from a physical uplink control channel resource that has an index of a value obtained by adding the individual shift value and the common shift value to the index of the enhanced physical downlink control channel resource.

(11) The response information receiving unit included in the base station according to an aspect of the invention extracts the physical uplink control channel from a physical uplink control channel resource which is determined by adding an individual shift value configured for a slot in which the enhanced physical downlink control channel was detected to an index of the enhanced physical downlink control channel resource.

(12) The base station according to an aspect of the invention further includes a higher layer control information notification unit that notifies the terminal of control information including a parameter indicating a plurality of individual shift values configured individually for each terminal, wherein the physical control information notification unit notifies the enhanced physical downlink control channel that indicates one of the plurality of individual shift values, and wherein the response information receiving unit extracts the physical uplink control channel from a physical uplink control channel resource which is determined by adding the individual shift value to an index of the enhanced physical downlink control channel resource.

(13) According to an aspect of the invention, there is provided a communications system in which communication is performed between a base station and a terminal, wherein the terminal includes: a downlink control channel detecting unit that monitors an enhanced physical downlink control channel allocated in a physical downlink shared channel region; a data extracting unit that, if the downlink control channel detecting unit has detected the enhanced physical downlink control channel, extracts transmit data on a physical downlink shared channel associated with the detected enhanced physical downlink control channel; a response information generating unit that generates response information for the extracted transmit data; an uplink control channel generating unit that generates a physical uplink control channel by mapping the response information to a physical uplink control channel resource corresponding to an enhanced physical downlink control channel resource in which the enhanced physical downlink control channel was detected; and a response transmitting unit that transmits a signal including the physical uplink control channel. The base station includes: a physical control information notification unit that notifies the terminal of the enhanced physical downlink control channel; and a response information receiving unit that extracts a physical uplink control channel to which response information for the transmit data on the physical downlink shared channel associated with the enhanced physical downlink control channel is mapped, from a physical uplink control channel resource corresponding to the enhanced physical downlink control channel resource in which the enhanced physical downlink control channel was allocated.

(14) According to an aspect of the invention, there is provided a communication method for a terminal that communicates with a base station, the method including: a step of monitoring a physical downlink control channel allocated in a physical downlink control channel region and an enhanced physical downlink control channel allocated in a physical downlink shared channel region different from the physical downlink control channel region; a step of, if the enhanced physical downlink control channel has been detected, extracting transmit data on a physical downlink shared channel associated with the detected enhanced physical downlink control channel; a step of generating response information for the extracted transmit data; a step of generating a physical uplink control channel by mapping the response information to a physical uplink control channel resource corresponding to an enhanced physical downlink control channel resource in which the enhanced physical downlink control channel was detected; and a step of transmitting a signal including the physical uplink control channel.

(15) According to an aspect of the invention, there is provided a communication method for a base station that communicates with a terminal, the method including: a step of notifying the terminal of an enhanced physical downlink control channel allocated in a physical downlink shared channel region; and a step of extracting a physical uplink control channel to which response information for transmit data on a physical downlink shared channel associated with the enhanced physical downlink control channel is mapped, from a physical uplink control channel resource corresponding to an enhanced physical downlink control channel resource in which the enhanced physical downlink control channel was allocated.

Advantageous Effects of Invention

According to the present invention, in a wireless communications system in which a base station and a terminal communicate with each other, physical uplink control channel resources can be efficiently specified even in a case where the base station notifies the terminal of control information not only over a physical downlink control channel but an enhanced physical downlink control channel.

BRIEF DESCRIPTION OF DRAWINGS

FIG. 7 is a correspondence table showing uplink control channel logical resources in the first embodiment.

DESCRIPTION OF EMBODIMENTS

First Embodiment

A first embodiment of the present invention is described below. A communications system according to the first embodiment includes a base station (base station device, downlink transmitting device, uplink receiving device, eNodeB) and a terminal (terminal device, mobile station device, downlink receiving device, uplink transmitting device, UE).

Figure 1:
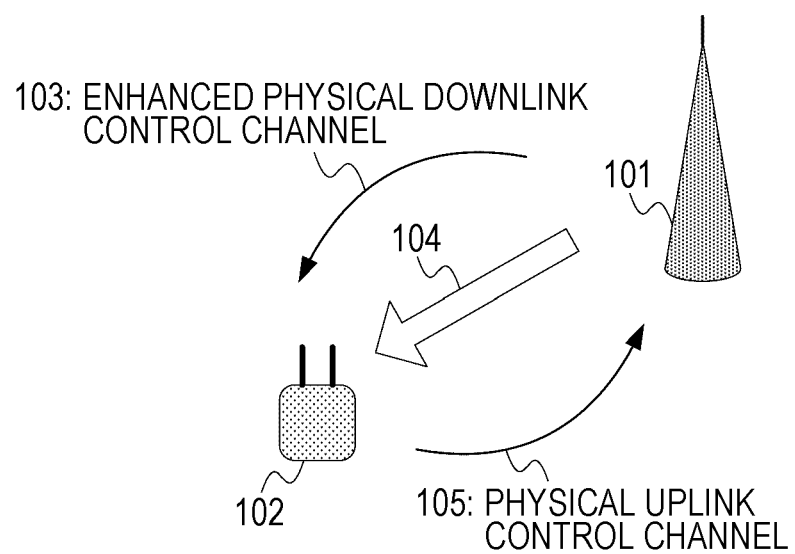
FIG. 1 shows an exemplary configuration of a communications system according to a first embodiment of the present invention.

FIG. 1 shows an exemplary configuration of the communications system according to the first embodiment. In FIG. 1, a base station 101 notifies a terminal 102 of control information associated with downlink transmit data 104 over a PDCCH and/or an enhanced physical downlink control channel (E-PDCCH) 103. The terminal 102 first performs detection of control information. If control information is detected, the terminal 102 uses it to extract downlink transmit data 104. After detecting the control information, the terminal 102 reports HARQ response information (also referred to as "Ack/Nack") indicating whether the downlink transmit data 104 has been successfully extracted or not to the base station 101 over a PUCCH. If the terminal 102 detects control information on the PDCCH, a resource for the physical uplink control channel (PUCCH) 105 available for the terminal 102 is implicitly/tacitly and uniquely determined from the resource for the PDCCH in which the control information was assigned. If the terminal 102 detects control information in the E-PDCCH 103, the resource for the PUCCH 105 available for the terminal 102 is implicitly/ tacitly and uniquely determined from the resource of the E-PDCCH 103 to which the control information is assigned.

Figure 2:
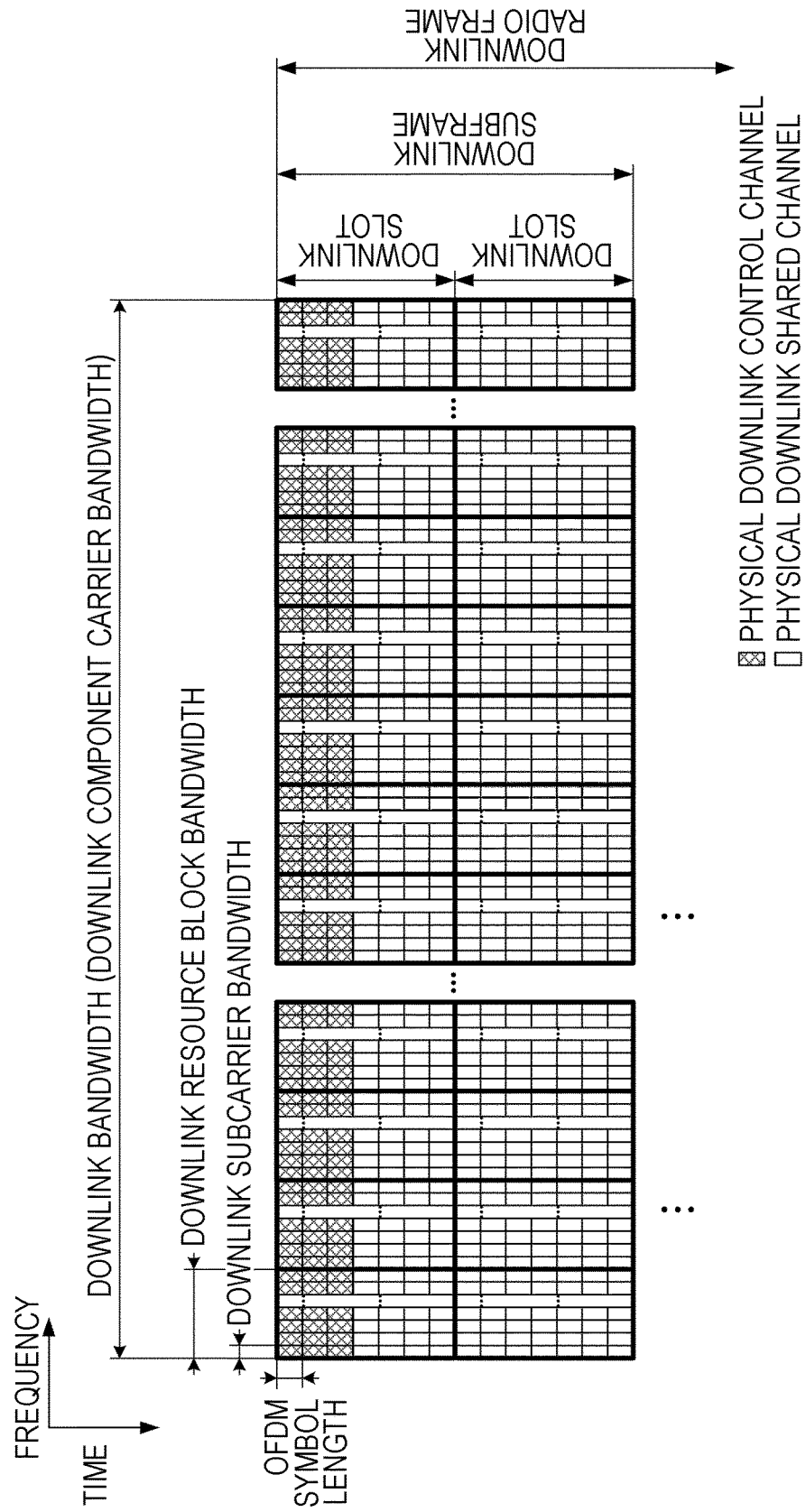
FIG. 2 shows an exemplary structure of a radio frame for the downlink according to the first embodiment.

FIG. 2 shows an exemplary structure of a radio frame for the downlink according to this embodiment. In the downlink, the OFDM access scheme is employed. In the downlink, PDCCH, physical downlink shared channel (PDSCH), and so forth are assigned. A downlink radio frame consists of a pair of downlink resource blocks (RBs). The downlink RB pair is a unit used such as for assigning downlink radio resources, consisting of a frequency band of a predetermined width (RB bandwidth) and a time slot (two slots=one subframe). A downlink RB pair consists of two downlink RBs that are continuous in time domain (RB bandwidth× slots). A downlink RB consists of twelve sub-carriers in frequency domain and seven OFDM symbols in time domain. A region that is defined by one sub-carrier in frequency domain and one OFDM symbol in time domain is called a resource element (RE). A physical downlink control channel is a physical channel on which downlink control information such as terminal device identifier, scheduling information for a physical downlink shared channel, scheduling information for a physical uplink shared channel, modulation scheme, coding rate, and retransmission parameters are transmitted. While downlink subframes in one component carrier (CC) are discussed herein, downlink subframes are defined for each CC and downlink subframes are substantially in synchronization with each other among CCs.

Figure 3:
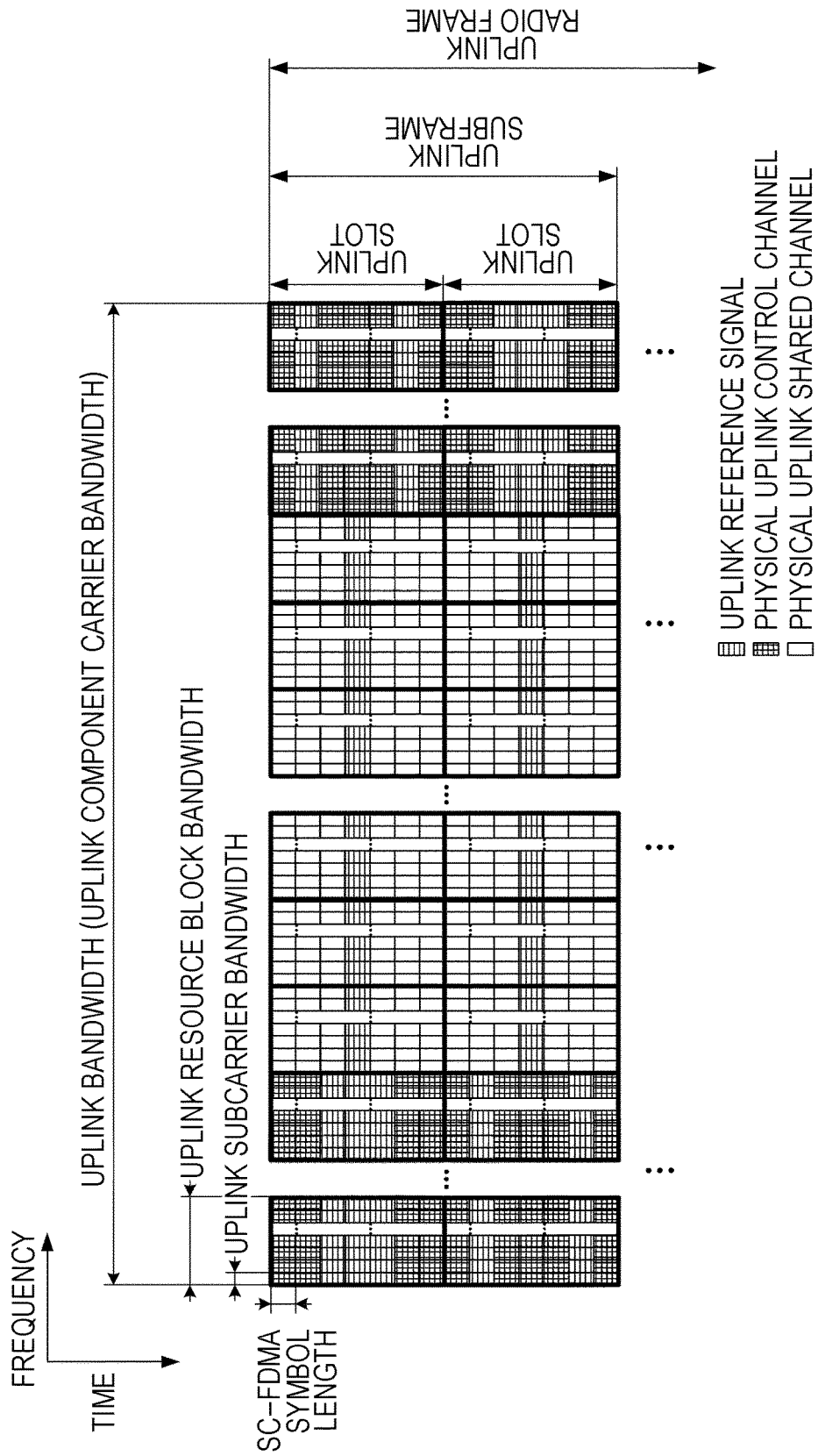
FIG. 3 shows an exemplary structure of a radio frame for the uplink according to the first embodiment.

FIG. 3 shows an exemplary structure of an uplink radio frame according to this embodiment. In the uplink, the SC-FDMA scheme is employed. In the uplink, physical uplink shared channel (PUSCH), PUCCH, and the like are assigned. An uplink reference signal is assigned to part of the PUSCH and/or the PUCCH. An uplink radio frame consists of an uplink RB pair. The uplink RB pair is the unit used such as for assigning uplink radio resources and the like, consisting of a frequency band of a predetermined width (RB bandwidth) and a time slot (two slots=one subframe). An uplink RB pair consists of two uplink RBs that are continuous in time domain (RB bandwidth×slots). An uplink RB consists of twelve sub-carriers in frequency domain and seven SC-FDMA symbols in time domain. While uplink subframes in one CC are discussed herein, uplink subframes are defined for each CC.

Figure 4:
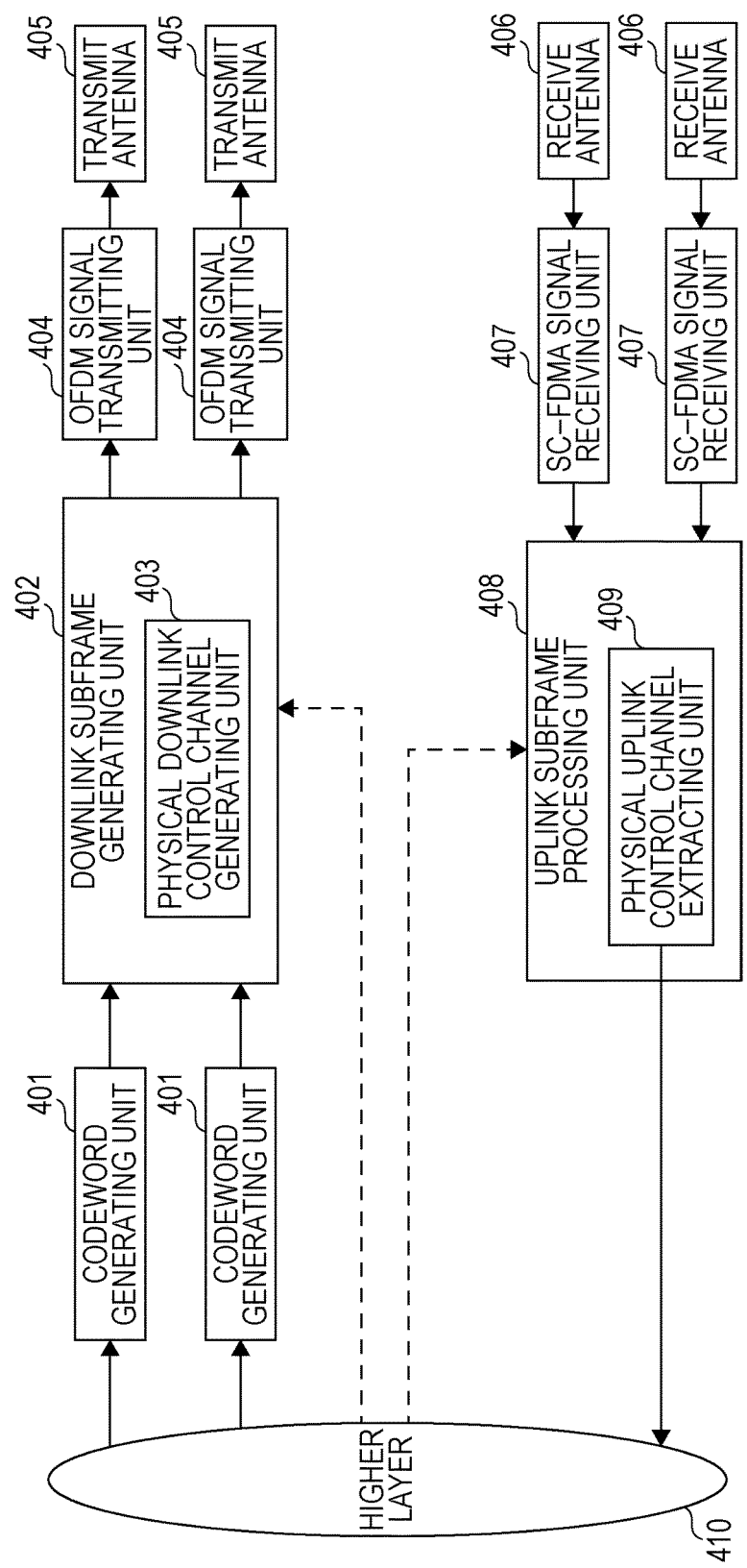
FIG. 4 is a schematic block diagram showing an exemplary configuration of a base station according to the first embodiment.

FIG. 4 is a schematic block diagram showing an exemplary configuration of the base station 101 in this embodiment. The base station 101 includes a codeword generating unit 401, a downlink subframe generating unit 402, an OFDM signal transmitting unit (physical control information notification unit) 404, a transmit antenna (base station transmit antenna) 405, a receive antenna (base station receive antenna) 406, an SC-FDMA signal receiving unit (response information receiving unit) 407, an uplink subframe processing unit 408, and a higher layer (higher layer control information notification unit) 410. The downlink subframe generating unit 402 has a physical downlink control channel generating unit 403. The uplink subframe processing unit 408 has a physical uplink control channel extracting unit 409.

Figure 5:
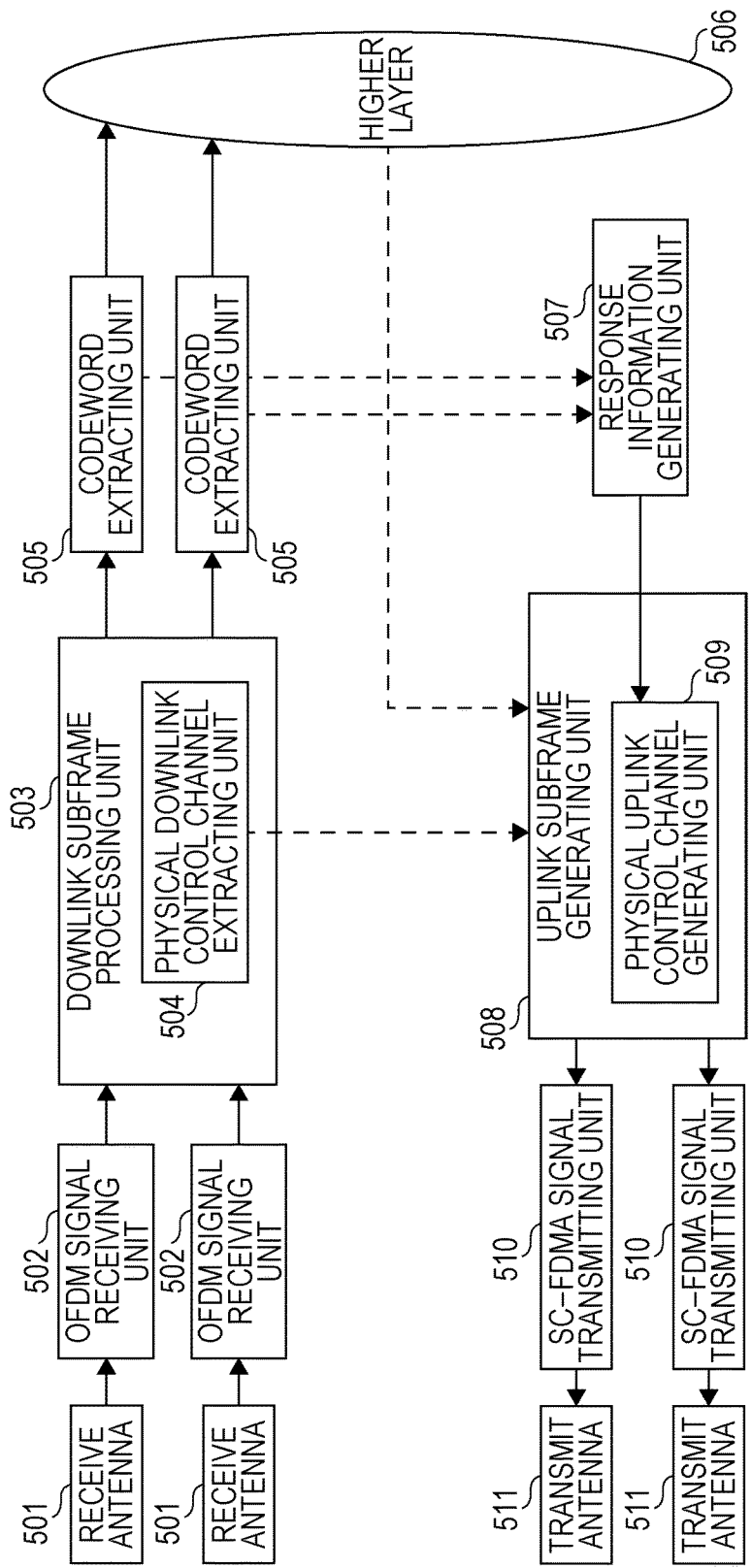
FIG. 5 is a schematic block diagram showing an exemplary configuration of a terminal according to the first embodiment.

FIG. 5 is a schematic block diagram showing an exemplary configuration of the terminal 102 in this embodiment. The terminal 102 includes a receive antenna (terminal receive antenna) 501, an OFDM signal receiving unit (downlink receiving unit) 502, a downlink subframe processing unit 503, a codeword extracting unit (data extracting unit) 505, a higher layer (higher layer control information acquiring unit) 506, a response information generating unit 507, an uplink subframe generating unit 508, an SC-FDMA signal transmitting unit (response transmitting unit) 510, and a transmit antenna (terminal transmit antenna) 511. The downlink subframe processing unit 503 has a physical downlink control channel extracting unit (downlink control channel detecting unit) 504. The uplink subframe generating unit 508 has a physical uplink control channel generating unit (uplink control channel generating unit) 509.

First, using FIGS. 4 and 5, the flow of downlink data transmission and reception is described. At the base station 101, transmit data (also called transport blocks) sent from the higher layer 410 goes through processes such as error correction coding and rate matching in the codeword generating unit 401, and a codeword is generated. A maximum of two codewords are transmitted simultaneously in a subframe within a cell. The downlink subframe generating unit 402 generates downlink subframes according to instructions from the higher layer 410. The codeword generated by the codeword generating unit 401 is first converted to a modulation symbol sequence through a modulation process such as phase shift keying (PSK) modulation and quadrature amplitude modulation (QAM) modulation. The modulation symbol sequence is also mapped to REs of some RBs and downlink subframes for each antenna port are generated through precoding. Downlink REs are defined so as to respectively correspond to sub-carriers in OFDM symbols. The transmit data sequence sent from the higher layer 410 here contains control information (higher layer control information) for radio resource control (RRC) signaling. The physical downlink control channel generating unit 403 generates a physical downlink control channel. The control information contained in the physical downlink control channel (downlink control information, downlink grant) includes information such as modulation and coding scheme (MCS) indicating the modulation scheme used in downlink and the like, downlink resources assignment indicating RBs used for data transmission, HARQ control information used for HARQ control (redundancy version, HARQ process number, new data indicator), and PUCCH-TPC (transmission power control) commands used for closed loop controlling transmission power on the PUCCH. The downlink subframe generating unit 402 maps the physical downlink control channel to REs in downlink subframes according to instructions from the higher layer 410. The downlink subframes for each antenna port generated by the downlink subframe generating unit 402 are modulated into an OFDM signal at the OFDM signal transmitting unit 404 and sent via the transmit antenna 405.

At the terminal 102, the OFDM signal is received by the OFDM signal receiving unit 502 via the receive antenna 501 and OFDM demodulation is performed. The downlink subframe processing unit 503 first detects a PDCCH (a first downlink control channel) or an E-PDCCH (a second downlink control channel) at the physical downlink control channel extracting unit 504. More specifically, the physical downlink control channel extracting unit 504 decodes it in a region in which a PDCCH can be placed (a first downlink control channel region) or in a region in which an E-PDCCH can be placed (a second downlink control channel region, a potential E-PDCCH), and checks its cyclic redundancy check (CRC) bits included in advance (blind decoding). That is, the physical downlink control channel extracting unit 504 monitors a PDCCH placed in the PDCCH region and an E-PDCCH placed in the PDSCH region, which is different from the PDCCH region. If the CRC bits match an ID preassigned by the base station, the downlink subframe processing unit 503 decides that a PDCCH or an E-PDCCH has been detected and extracts the PDSCH using control information contained in the detected PDCCH or E-PD-CCH. More specifically, RE demapping and/or demodulation corresponding to the RE mapping and/or modulation performed at the downlink subframe generating unit 402 is applied. The PDSCH extracted from the received downlink subframes is sent to the codeword extracting unit 505. The codeword extracting unit 505 performs rate matching, error correction decoding, and the like corresponding to the rate matching and error correction coding performed at the codeword generating unit 401 and extracts transport blocks, which are then sent to the higher layer 506. That is, if the physical downlink control channel extracting unit 504 has detected a PDCCH or E-PDCCH, the codeword extracting unit 505 extracts transmit data on the PDSCH associated with the detected PDCCH or E-PDCCH, and sends it to the higher layer 506.

Next, the flow of transmission and reception of HARQ response information for downlink transmit data is described. At the terminal 102, after the codeword extracting unit 505 determines whether transport blocks have been successfully extracted or not, information indicating success/failure is sent to the response information generating unit 507. The response information generating unit 507 generates HARQ response information and sends it to the physical uplink control channel generating unit 509 in the uplink subframe generating unit 508. In the uplink subframe generating unit 508, a PUCCH including the HARQ response information (uplink control information) is generated by the physical uplink control channel generating unit 509 based on parameters sent from the higher layer 506 and the resource in which the PDCCH or E-PDCCH was placed at the physical downlink control channel extracting unit 504, and the generated PUCCH is mapped to RBs of uplink subframes. That is, the response information is mapped to a PUCCH resource to generate a PUCCH. The SC-FDMA signal transmitting unit 510 applies SC-FDMA modulation to the uplink subframes to generate an SC-FDMA signal, and transmits it via the transmit antenna 511.

At the base station 101, the SC-FDMA signal is received by the SC-FDMA signal receiving unit 407 via the receive antenna 406 and is subjected to SC-FDMA demodulation. The uplink subframe processing unit 408 extracts the RBs to which the PUCCH is mapped according to instructions from the higher layer 410, and the physical uplink control channel extracting unit 409 extracts the HARQ response control information contained in the PUCCH. The extracted HARQ response control information is sent to the higher layer 410. The HARQ response control information is used for HARQ control at the higher layer 410.

Next, PUCCH resources handled in the uplink subframe generating unit 508 will be discussed. HARQ response control information is spread over an SC-FDMA sample region using a cyclically shifted pseudo constant-amplitude zero-auto correlation (CAZAC) sequence, and further spread over four SC-FDMA symbols in a slot using an orthogonal cover code (OCC) having a code length of 4. The symbols spread with the two codes are mapped to two RBs of different frequencies. Thus, a PUCCH resource is defined by three elements: the cyclic shift value, an orthogonal code, and mapped RBs. Cyclic shift in the SC-FDMA sample region can also be represented by phase rotation that uniformly increases in frequency domain.

Figure 6:
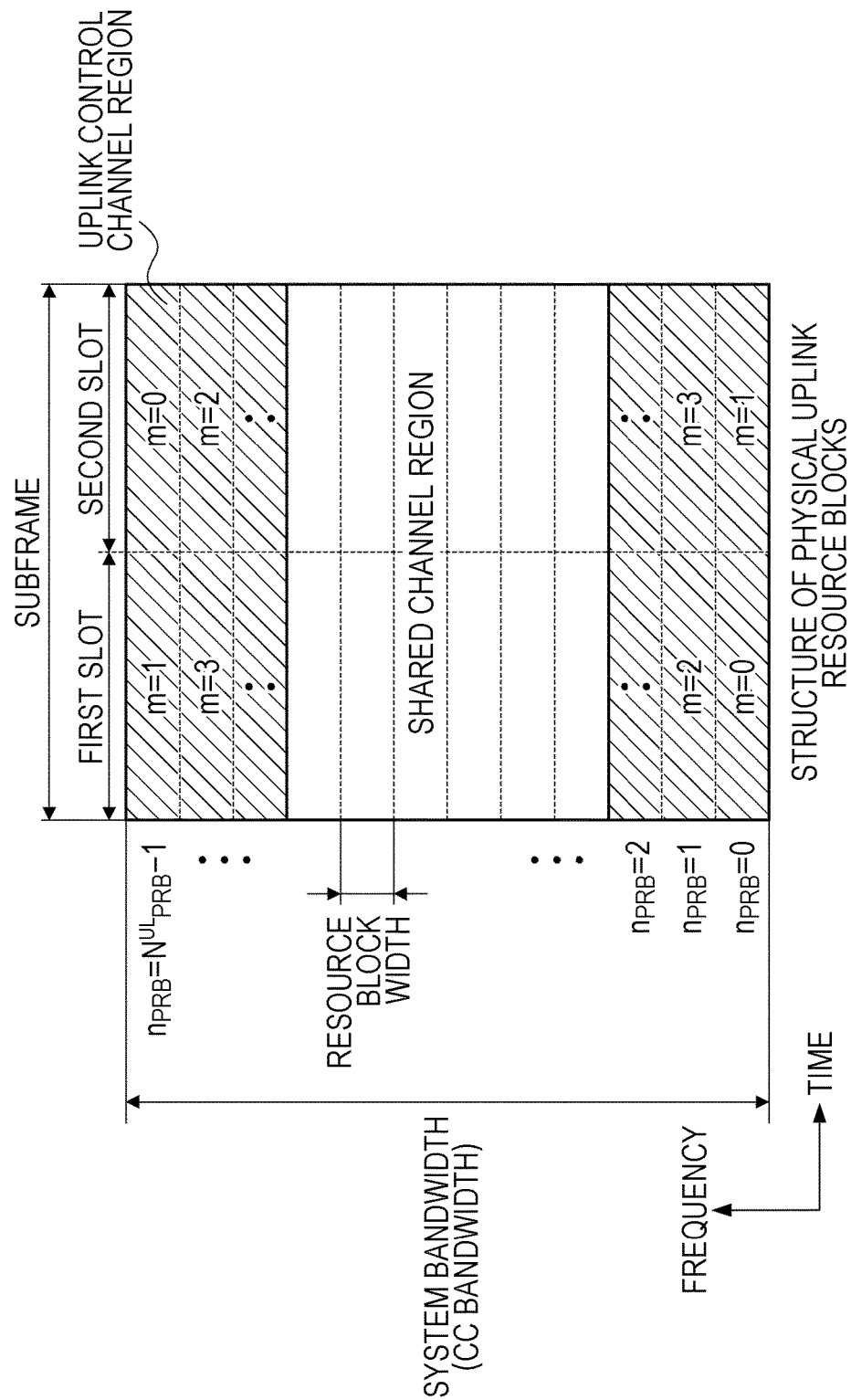
FIG. 6 shows the structure of physical uplink resource blocks in an uplink control channel region to which a PUCCH is assigned in the first embodiment.

FIG. 6 shows the structure of physical uplink resource blocks in an uplink control channel region to which a PUCCH is assigned (uplink control channel physical resources). An RB pair consists of two RBs having different frequencies in a first slot and a second slot. A PUCCH is placed in any of RB pairs with m=0, 1, 2, . . . .

FIG. 7 is a correspondence table showing uplink control channel logical resources. An example of PUCCH resources is shown here representing a case where three orthogonal codes, OC0, OC1, and OC2, six cyclic shift values, CS0, CS2, CS4, CS6, CS8, and CS10, and "m" which indicates a frequency resource are assumed as the elements constituting the PUCCH. A combination of an orthogonal code, a cyclic shift value, and a value of m is uniquely defined for each value of $n_{PUCCH}$, which is an index indicating a PUCCH resource (an uplink control channel logical resource). The correspondence between $n_{PUCCH}$ and combinations of an orthogonal code, a cyclic shift value, and m illustrated in FIG. 7 is an example and other ways of correspondence are possible. For example, correspondence may be such that the cyclic shift value or m varies with consecutive values of $n_{PUCCH}$. Alternatively, CS1, CS3, CS5, CS7, CS9, and CS11 which are cyclic shift values distinct from CS0, CS2, CS4, CS6, CS8, and CS10 may be used. In the shown example, the value of m is equal to or greater than $N_{F2}$. Frequency resources with m smaller than $N_{F2}$ are $N_{F2}$ frequency resources reserved for PUCCH transmission for feeding back channel condition information.

Figure 8:
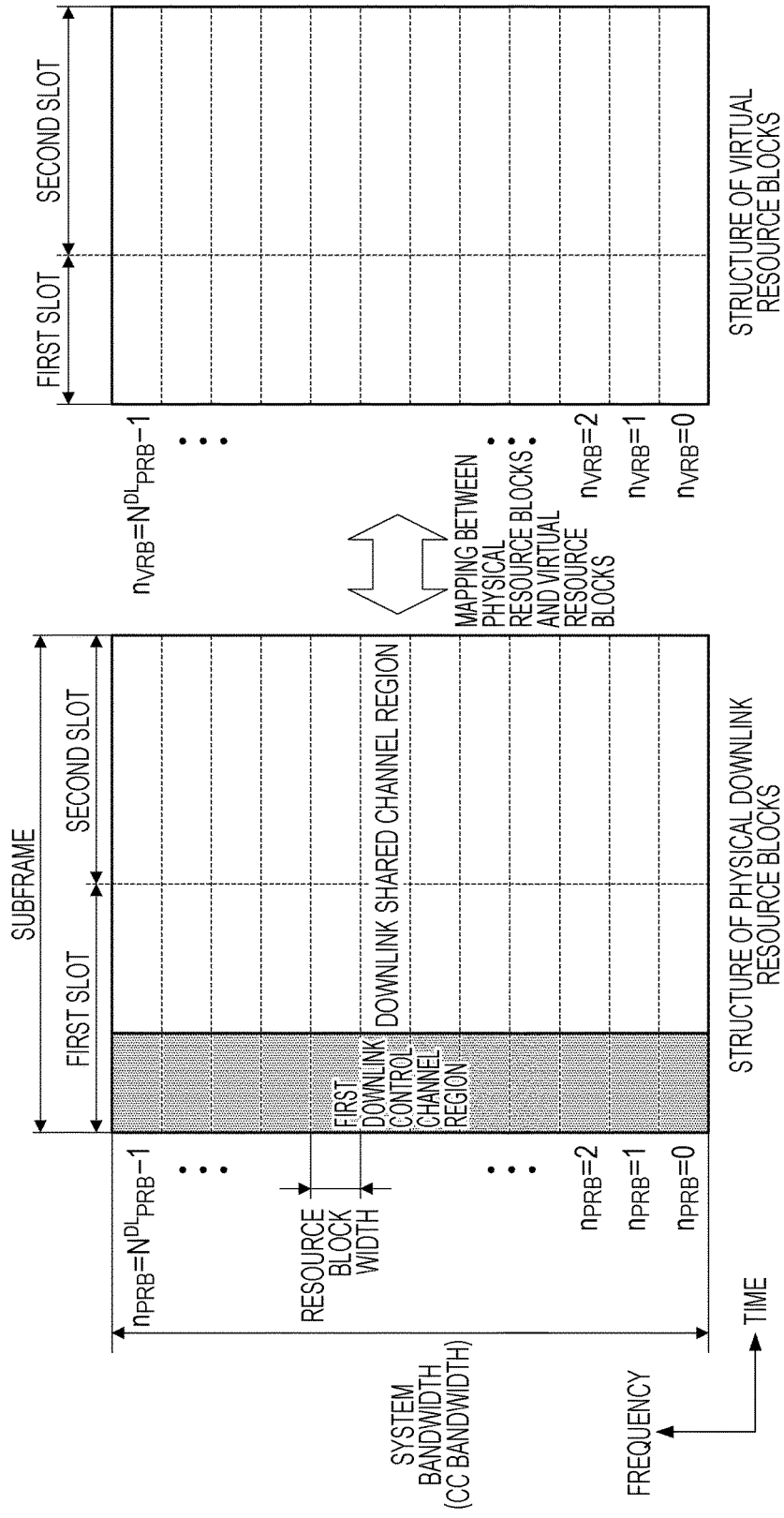
FIG. 8 shows physical resource blocks PRB and virtual resource blocks VRB in PDCCH and PDSCH regions in the first embodiment.

Next, PDCCH and E-PDCCH are described. FIG. 8 shows physical resource blocks PRB (physical RBs) and virtual resource blocks VRB (virtual RBs) in PDCCH and PDCCH regions. An RB in an actual subframe is called PRB, while an RB as a logical resource used for RB assignment is called VRB. $N^{DL}_{PRB}$ is the number of PRBs arranged in frequency direction within a downlink CC. Numbers $n_{PRB}$ are assigned to PRBs (or PRB pairs), where $n_{PRB}$ is 0, 1, 2, . . . , $N^{DL}_{PRB}-1$ in ascending order of frequency. The number of VRBs arranged in frequency direction in a downlink CC is equal to $N^{DL}_{PRB}$. Numbers $n_{VRB}$ are assigned to VRBs (or VRB pairs), where $n_{VRB}$ is 0, 1, 2, . . . , $N^{DL}_{PRB}-1$ in ascending order of frequency. PRBs and VRBs are explicitly or implicitly/tacitly mapped to each other. Numbers as referred to herein may be represented as indices as well.

Figure 9:
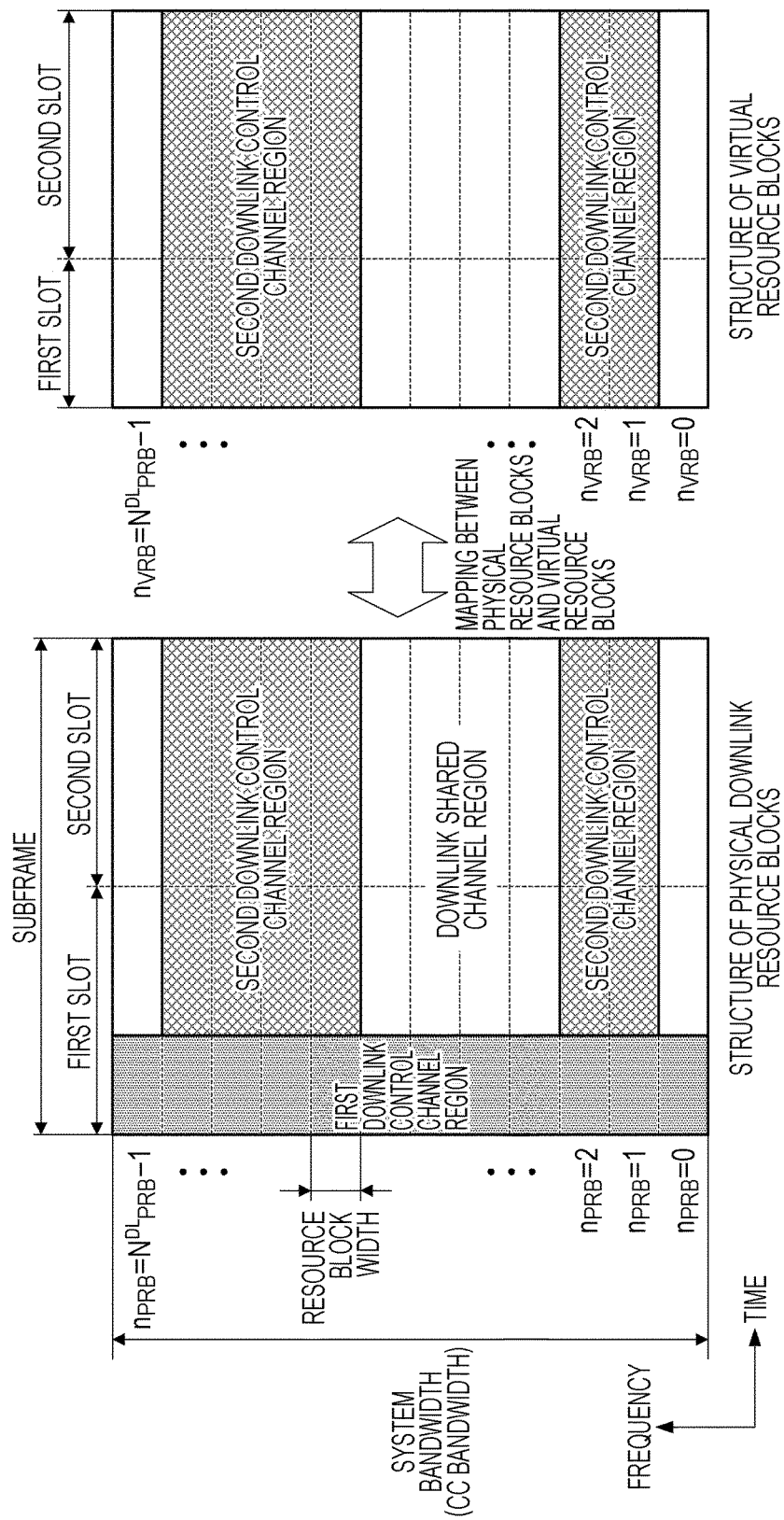
FIG. 9 shows an example of PRB-VRB mapping in E-PDCCH and PDSCH regions in the first embodiment.

Now referring to FIG. 9, an example of mapping between PRBs and VRBs in E-PDCCH region and PDSCH region is shown. In this PRB-VRB mapping scheme, a PRB pair and a VRB pair having the same $n_{PRB}$ and $n_{VRB}$ number are mapped to each other. That is, a modulation symbol for transmit data or control information assigned to REs of a VRB pair with $n_{VRB}$ is mapped to REs of the PRB pair with $n_{PRB}=n_{VRB}$ as it is.

Figure 10:
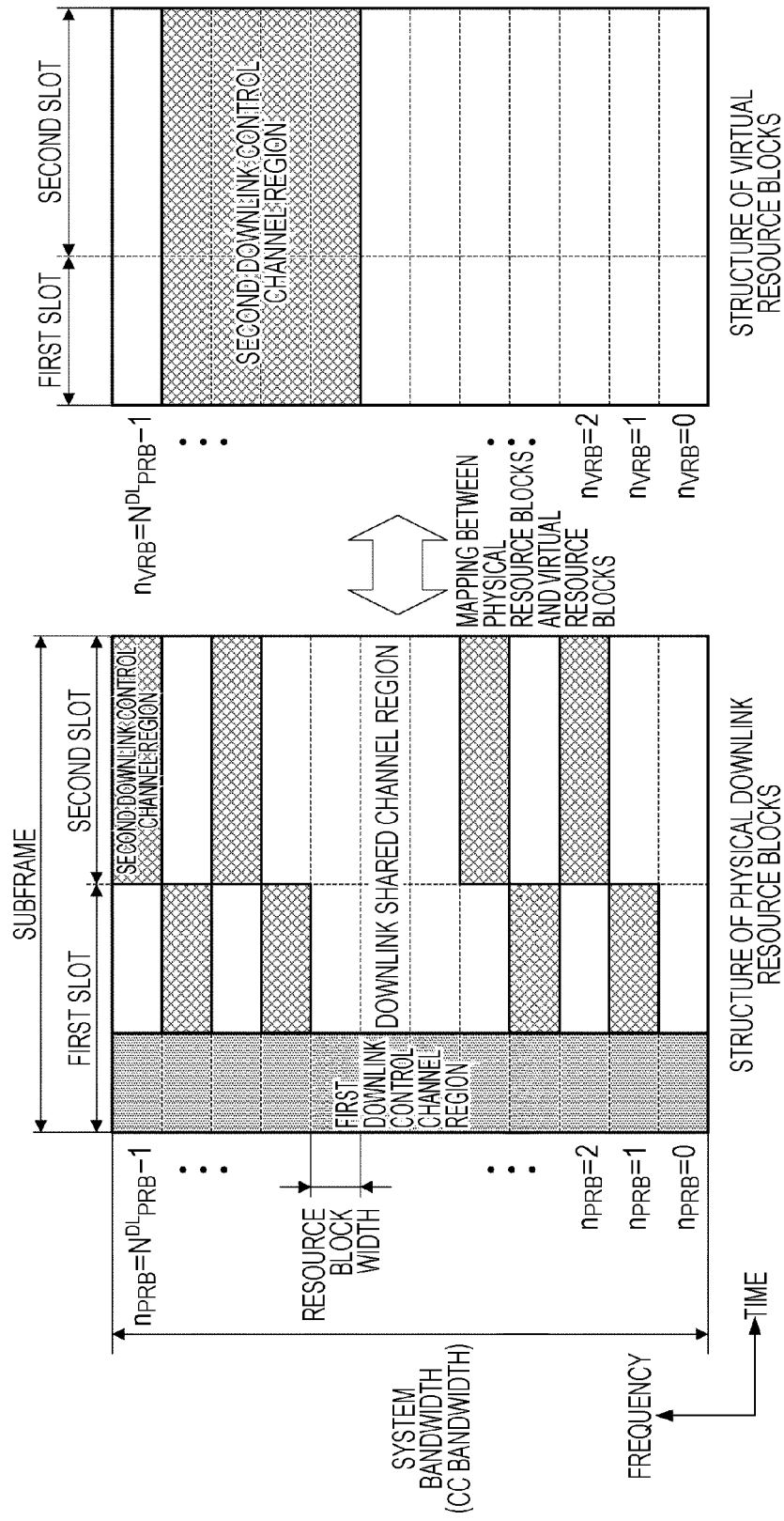
FIG. 10 shows another example of PRB-VRB mapping in E-PDCCH and PDSCH regions in the first embodiment.

Next, referring to FIG. 10, another example of PRB-VRB mapping in E-PDCCH region and PDSCH region is shown. In this PRB-VRB mapping scheme, VRBs that are contiguous on the frequency axis are mapped to PRBs at positions discrete on the frequency axis. Further, the VRB in the first slot and the VRB in the second slot of a VRB pair having the same $n_{VRB}$ number are mapped to PRBs at positions discrete on the frequency axis. However, the VRB from the first slot is mapped to the PRB in the first slot and the VRB from the second slot is mapped to the PRB in the second slot. That is, frequency hopping within a slot and slot hopping (frequency hopping among slots) are applied.

As described, some (or all) of VRB pairs are defined as an E-PDCCH region (a region in which an E-PDCCH can be potentially placed). Further, in accordance with a PRB-VRB mapping scheme specified explicitly or implicitly/tacitly, some (or all) of PRB pairs in the PDSCH region or slot-hopped PRBs are substantially defined as an E-PDCCH region.

Figure 11:
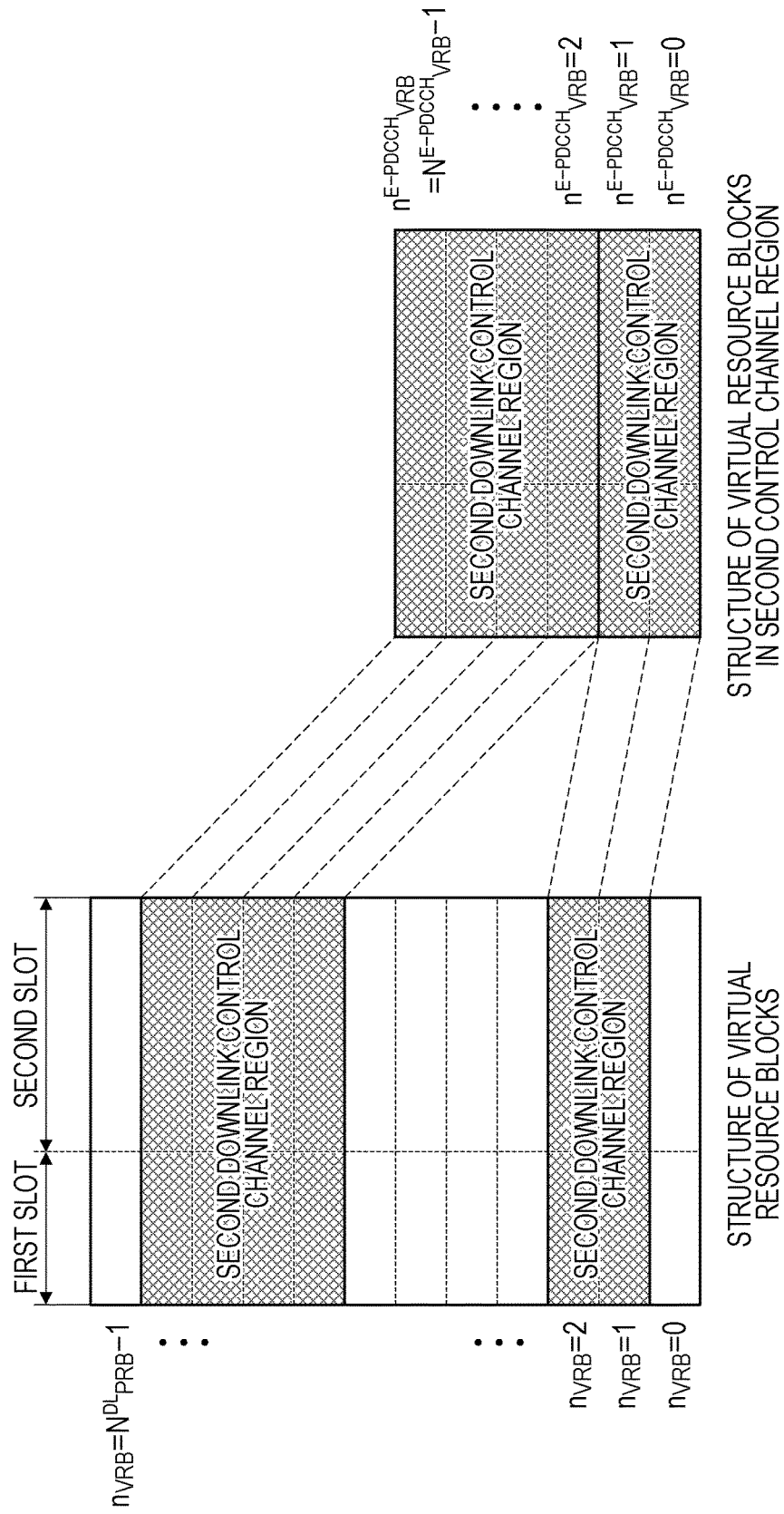
FIG. 11 shows an exemplary numbering of VRBs in an E-PDCCH region in the first embodiment.

FIG. 11 shows an exemplary numbering of VRBs in an E-PDCCH region. Of $N^{DL}_{PRB}$ VRB pairs, $N^{E-PDCCH}_{VRB}$ VRB pairs that are configured in an E-PDCCH region are taken, and assigned VRB index $N^{E-PDCCH}_{VRB}$ for the E-PDCCH region as 0, 1, 2, . . . , $N^{E-PDCCH}_{VRB}-1$ starting with the VRB pair of the lowest frequency. That is, in frequency domain, a set of $N^{E-PDCCH}_{VRB}$ VRBs is configured for potential E-PDCCH transmission through the higher layer signaling (e.g., individual signaling to terminals or common signaling in a cell).

Figure 12:
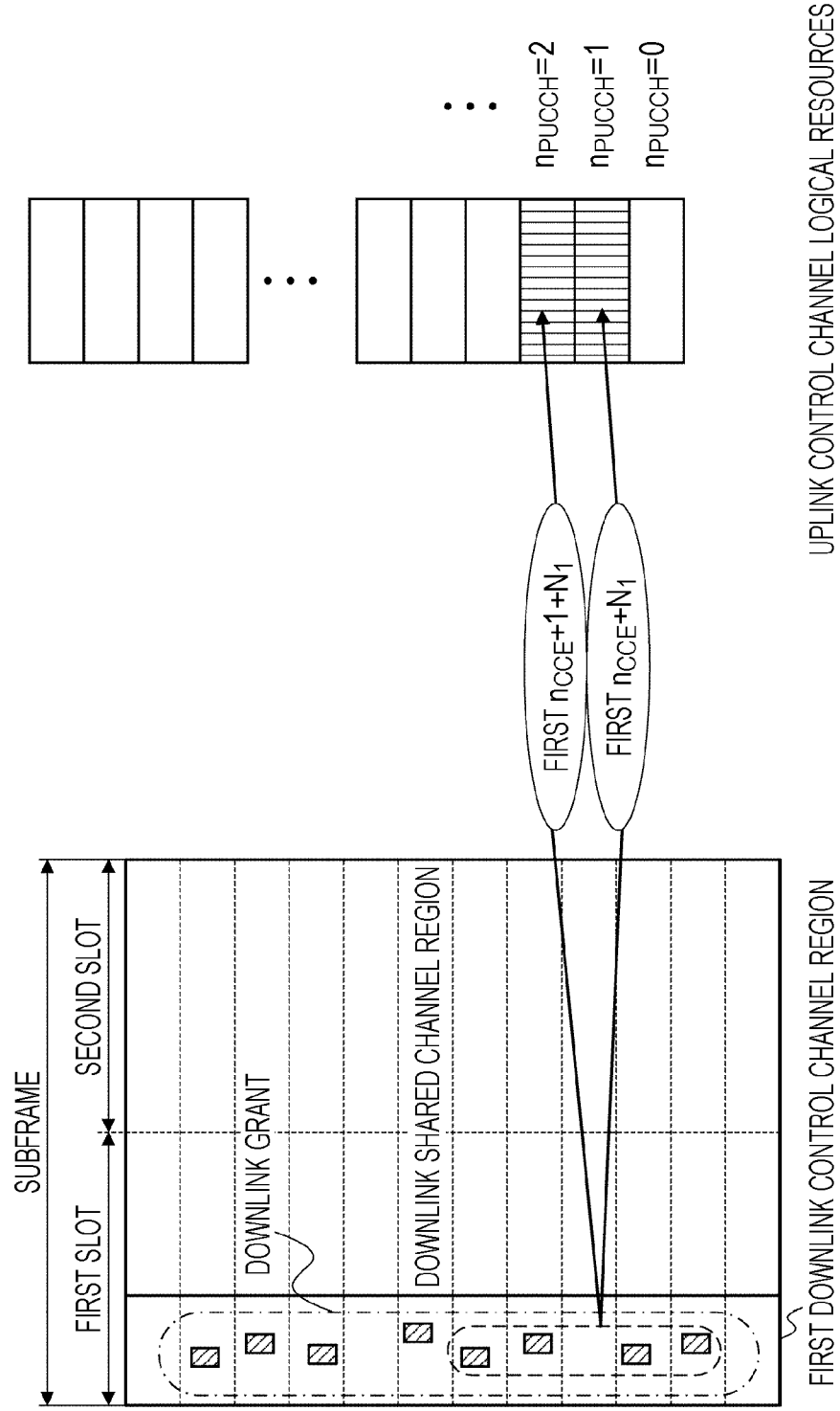
FIG. 12 illustrates the structure of PDCCH and assignment of PUCCH resources in the first embodiment.

Next, the structure of PDCCH and assignment of PUCCH resources are described. FIG. 12 illustrates the structure of a PDCCH and assignment of PUCCH resources. A PDCCH consists of multiple control channel elements (CCE) in the PDCCH region. A CCE consists of multiple downlink resource elements (resources each defined by one OFDM symbol and one sub-carrier).

CCEs in the PDCCH region are given number $n_{CCE}$ for identifying the CCEs. The CCEs are numbered according to a predefined rule. A PDCCH consists of a set of multiple CCEs (CCE aggregation). The number of CCEs constituting such a set is called CCE aggregation level. The CCE aggregation level for constructing the PDCCH is configured at the base station 101 according to the coding rate set for the PDCCH and the number of bits in downlink control information (DCI) (control information sent on the PDCCH or E-PDCCH) included in the PDCCH. Combinations of CCE aggregation levels that can be used for a terminal are predetermined. Also, a set of n CCEs is called "CCE aggregation level n".

A RE group (REG) consists of four REs contiguous in frequency domain. Further, a CCE consists of nine different REGs distributed in frequency domain and time domain within the PDCCH region. Specifically, interleaving is applied in units of REG to all REGs that have been numbered in the entire downlink CC using a block interleaver, and nine contiguous REGs after the interleaving constitute one CCE.

For each terminal, a search space (SS), which is a region in which to search for the PDCCH, is configured. An SS consists of multiple CCEs. CCEs are numbered beforehand, and an SS consists of CCEs having consecutive numbers. The number of CCEs that constitute a certain SS is predetermined. An SS for each CCE aggregation level consists of a set of multiple PDCCH candidates. SS is classified into cell-specific search space (CSS or cell-specific SS) for which the number of the CCE having the smallest number among the CCEs constituting the SS is common in a cell, and terminal-specific search space (USS or UE-specific SS) for which the lowest CCE index is specific to a terminal. In the CSS, a PDCCH to which control information intended for multiple terminals 102 such as system information and paging information is assigned (or included), or a PDCCH to which a downlink/uplink grant indicating a command for fallback to a lower-level transmission scheme or random access is assigned (or included) can be placed.

The base station 101 transmits the PDCCH using one or more CCEs included in the SS which is configured at the terminal 102. The terminal 102 decodes the received signal using one or more CCEs in the SS and performs processing for detecting any PDCCH intended to the terminal. As mentioned earlier, this process is called blind decoding. The terminal 102 configures different SSs for different CCE aggregation levels. The terminal 102 then performs blind decoding using a predetermined combination of CCEs in the SS which is distinct from one CCE aggregation level to another. In other words, the terminal 102 performs blind decoding on PDCCH candidates in SSs that vary among CCE aggregation levels. The series of actions thus conducted at the terminal 102 is called PDCCH monitoring.

Upon detecting a downlink grant in the PDCCH region, the terminal 102 reports HARQ response information for downlink transmit data (PDSCH) corresponding to the downlink grant using a PUCCH resource corresponding to the CCE index of the CCE having the lowest CCE index among the CCEs constructing the PDCCH including the downlink grant. Reversely, when placing a PDCCH containing a downlink grant, the base station 101 places the PDCCH in CCEs that correspond to the PUCCH resource in which the terminal 102 will report HARQ response information for downlink transmit data (PDSCH) corresponding to the downlink grant. The base station 101 receives the HARQ response information corresponding to the PDSCH sent to the terminal 102 via the PUCCH which it has scheduled. More specifically, as shown in FIG. 12, among the CCEs that constitute a PDCCH containing a downlink grant, a PUCCH resource that has an index $n_{PUCCH}$ equal to the sum of the CCE number $n_{CCE}$ of the first CCE and $N_1$, which is a cell specific parameter, represents the PUCCH resource assigned for HARQ response information of downlink transmit data corresponding to the downlink grant.

It is also possible that multiple PUCCH resources are required for one PDCCH, such as when there are two or more pieces of HARQ response information because two or more codewords are included in downlink transmit data corresponding to a downlink grant or when one piece of response information is sent by diversity transmission using multiple PUCCH resources, for example. In such a case, of the CCEs constituting the PDCCH containing the downlink grant, the PUCCH resource corresponding to the lowest CCE index and also a PUCCH resource having an index larger than that PUCCH resource by one are used. More specifically, as shown in FIG. 12, among the CCEs constituting the PDCCH containing the downlink grant, the PUCCH resource having an index $n_{PUCCH}$ equal to the sum of the CCE number $n_{CCE}$ of the first CCE and cell-specific parameter $N_1$, and the PUCCH resource having an index $n_{PUCCH}$ equal to the sum of the CCE number $n_{CCE}$ of the first CCE, one, and the cell-specific parameter $N_1$ represent the PUCCH resources assigned for HARQ response information of downlink transmit data corresponding to the downlink grant. If two or more PUCCH resources are required, PUCCH resources having indices which are larger by one may be used in a similar manner.

Figure 13:
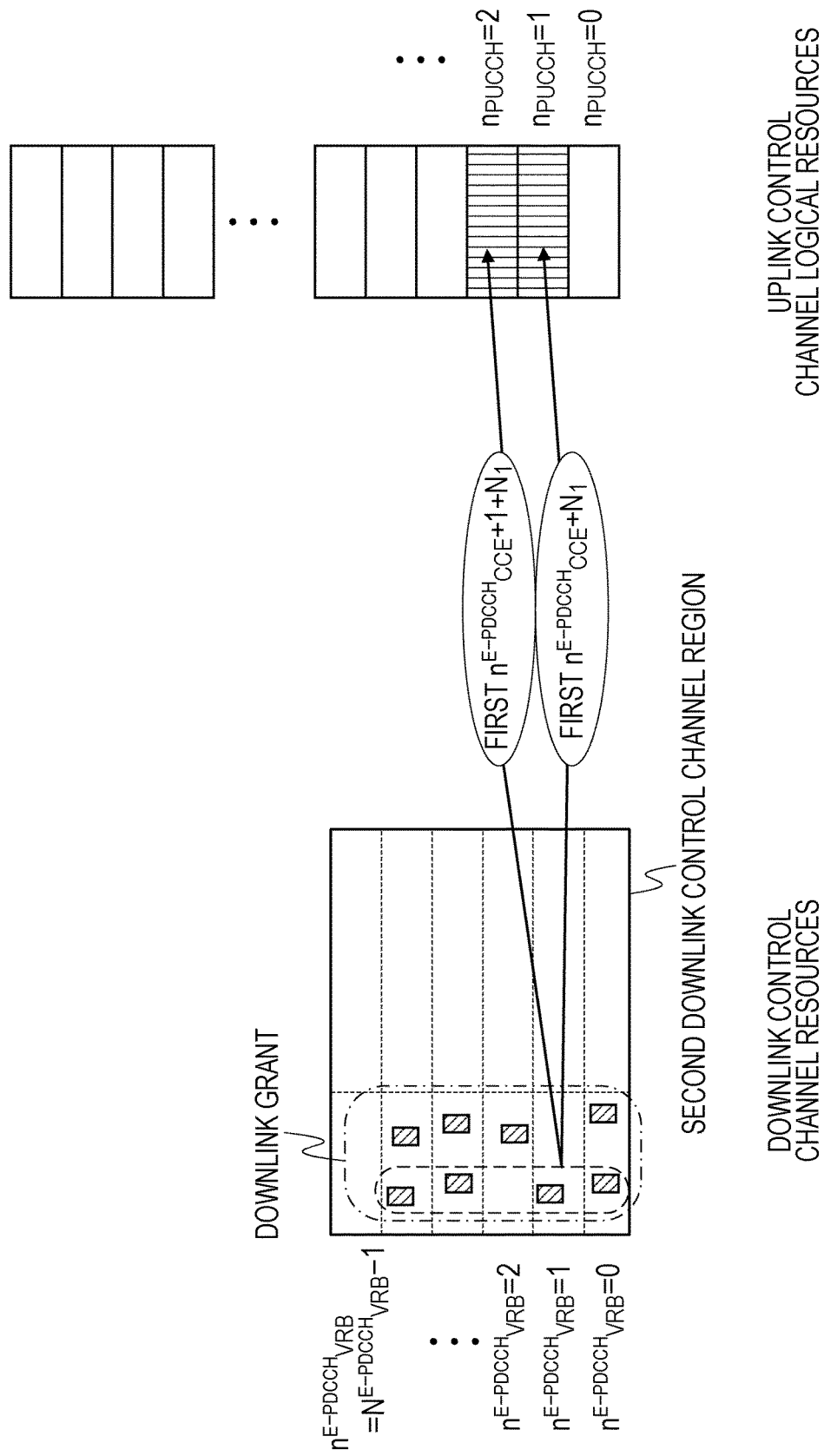
FIG. 13 illustrates the structure of E-PDCCH and assignment of PUCCH resources in the first embodiment.

Next, the structure of E-PDCCH and assignment of PUCCH resources are described. FIG. 13 shows the structure of E-PDCCH and assignment of PUCCH resources. Note that the E-PDCCH shown in FIG. 13 represents the E-PDCCH structure and PUCCH resource assignment when cross-interleaving (a type of interleaving in which individual elements constituting an E-PDCCH are allocated across RBs, also called block interleaving) is employed. An E-PDCCH consists of multiple CCEs in an E-PDCCH region. Specifically, like a PDCCH, an REG consists of four REs contiguous in frequency domain. A CCE consists of nine different REGs distributed in frequency domain and time domain in the E-PDCCH region. In the E-PDCCH region, individual E-PDCCHs are allocated in the first slot and the second slot.

CCEs in the E-PDCCH region are assigned numbers $n^{E-PDCCH}_{CCE}$ for identifying the CCEs. In the E-PDCCH region, CCEs are independently placed in the first slot and the second slot and numbers for identifying the CCEs are also independently assigned. In the described example, $n^{E\text{-}PDCCH}_{CCE}$ is configured independently of $n_{CCE}$. That is, some of the values of $n^{E\text{-}PDCCH}_{CCE}$ overlap possible values of $n_{CCE}$.

Upon detecting a downlink grant in the E-PDCCH region, the terminal 102 reports HARQ response information for downlink transmit data (PDSCH) corresponding to the downlink grant using a PUCCH resource based on the CCE index of the CCE having the lowest CCE index among the CCEs constructing the E-PDCCH containing the downlink grant. When assigning an E-PDCCH containing a downlink grant, the base station 101 assigns the E-PDCCH in the CCE corresponding to the PUCCH resource in which the terminal 102 will report HARQ response information for the downlink transmit data (PDSCH) corresponding to the downlink grant. The base station 101 also receives the HARQ response information corresponding to the PDSCH sent to the terminal 102 via the PUCCH which it has scheduled. More specifically, as shown in FIG. 13, a PUCCH resource that has an index $n_{PUCCH}$ equal to the sum of the CCE number $n^{E\text{-}PDCCH}_{CCE}$ of the first CCE among the CCEs that constitute the E-PDCCH containing a downlink grant and cell specific parameter $N_1$ represents the PUCCH resource assigned for HARQ response information of downlink transmit data corresponding to the downlink grant. Since CCE index $n^{E\text{-}PDCCH}_{CCE}$ for CCEs in the E-PDCCH region and CCE index $n_{CCE}$ for CCEs in the PDCCH region are independently assigned as mentioned above, when assigning one or more PDCCHs and one or more E-PDCCHs in the same subframe, the base station 101 carries out scheduling of downlink grant assignment in CCEs such that the CCE number $n_{CCE}$ of the first CCE of each PDCCH and the CCE number $n^{E\text{-}PDCCH}_{CCE}$ of the first CCE of each E-PDCCH are all different numbers.

Alternatively, the base station 101 may assign $n^{E\text{-}PDCCH}_{CCE}$ and $n_{CCE}$ in connection with each other so that the CCE number $n_{CCE}$ of the first CCE of PDCCHs and the CCE number $n^{E\text{-}PDCCH}_{CCE}$ of the first CCE of E-PDCCHs are all different numbers. For example, the first (lowest) value of the $n^{E\text{-}PDCCH}_{CCE}$ value is configured to $N_{CCE}$ or a certain value greater than $N_{CCE}$. This keeps some of $n^{E\text{-}PDCCH}_{CCE}$ values from overlapping possible values of $n_{CCE}$ and thus avoids collisions of PUCCH resources within the same subframe.

When multiple PUCCH resources are required for one E-PDCCH, the PUCCH resource corresponding to the CCE index of the CCE having the lowest CCE index among the CCEs constructing the E-PDCCH containing the downlink grant and the PUCCH resource having an index larger than that PUCCH resource by one are used. More specifically, as shown in FIG. 13, the PUCCH resource having index $n_{PUCCH}$ equal to the sum of the CCE number $n^{E\text{-}PDCCH}_{CCE}$ of the first CCE among the CCEs that constitute the E-PDCCH containing a downlink grant and cell specific parameter $N_1$, and the PUCCH resource having index $n_{PUCCH}$ equal to the sum of the CCE number $n^{E\text{-}PDCCH}_{CCE}$ of the first CCE, one, and the cell specific parameter $N_1$ represent the PUCCH resources assigned to HARQ response information for downlink transmit data corresponding to the downlink grant. If multiple PUCCH resources are required, PUCCH resources having indices which are larger by one may be used in a similar manner. When assigning one or more PDCCHs and one or more E-PDCCHs in the same subframe in such a case, the base station 101 carries out scheduling of downlink grant assignment in CCEs such that the CCE number $n_{CCE}$ of the first CCE and the next largest CCE number $n_{CCE}$ of each PDCCH and the CCE number $n^{E\text{-}PDCCH}_{CCE}$ of the first CCE and the next largest CCE number $n^{E\text{-}PDCCH}_{CCE}$ of each E-PDCCH are all different numbers.

Figure 14:
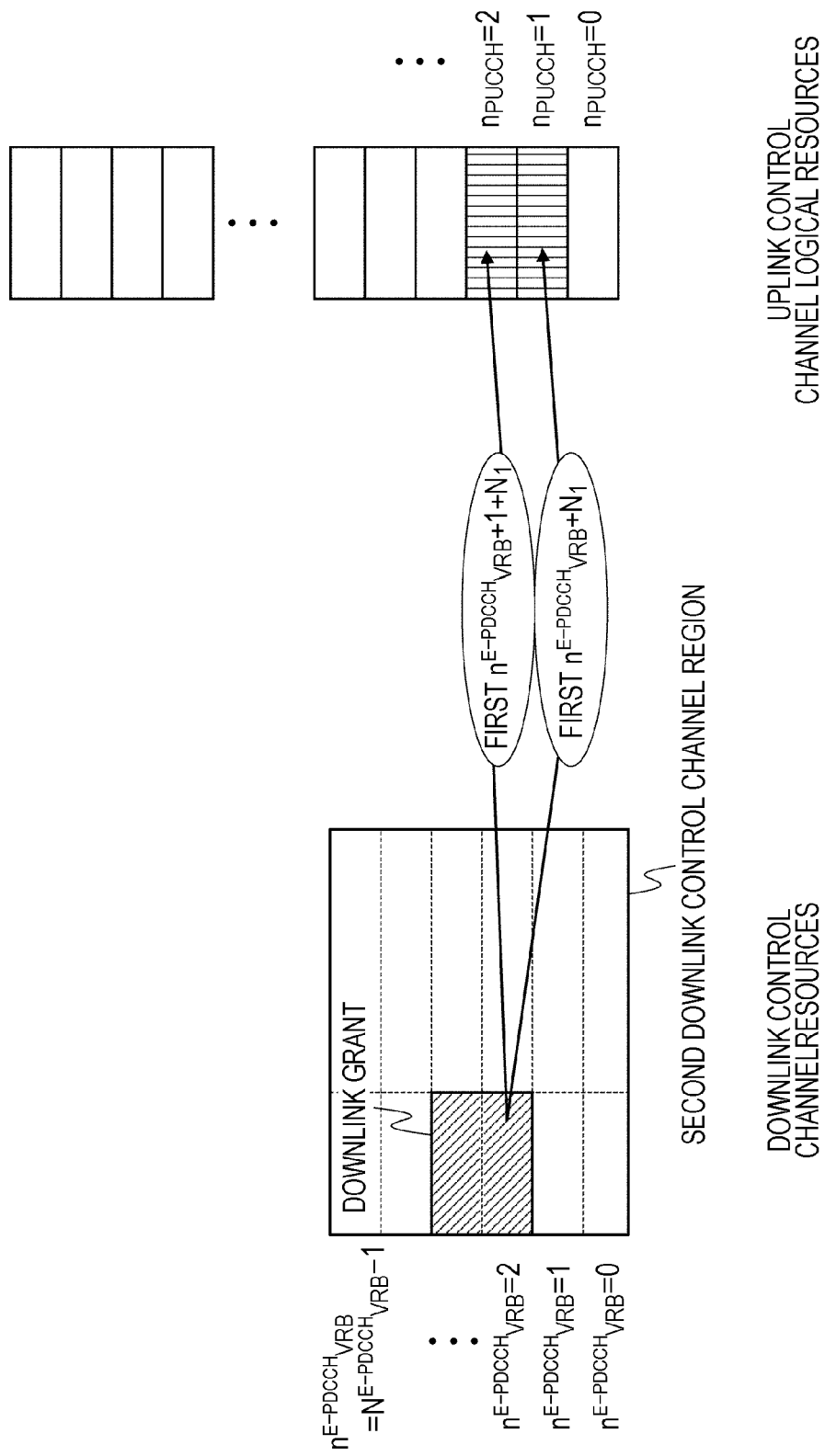
FIG. 14 illustrates the structure of E-PDCCH and assignment of PUCCH resources in the first embodiment.

Next, another example of E-PDCCH structure and assignment of PUCCH resources is shown. FIG. 14 shows the structure of an E-PDCCH and assignment of PUCCH resources. Note that the E-PDCCH shown in FIG. 14 represents the E-PDCCH structure and PUCCH resource assignment when cross-interleaving is not employed. The E-PDCCH consists of multiple VRBs in the E-PDCCH region. Specifically, unlike the PDCCH, the E-PDCCH is made up of VRBs instead of CCEs, being structured as a set of one or more contiguous VRBs. The number of VRBs constituting such a set is called VRB aggregation level. That is, in an E-PDCCH region to which cross-interleaving is not applied, an SS consists of multiple VRBs. The VRB aggregation level with which to construct an E-PDCCH is configured at the base station 101 according to the coding rate set for the E-PDCCH and the number of bits in DCI to be included in the E-PDCCH. Combinations of VRB aggregation levels that can be used for the terminal 102 are predetermined, and the terminal 102 performs blind decoding using the predetermined combinations of VRBs in a SS. In the E-PDCCH region, individual E-PDCCHs are assigned in the first slot and the second slot.

VRBs in the E-PDCCH region are assigned numbers $n^{E\text{-}PDCCH}_{VRB}$ for identifying the VRBs. In the E-PDCCH region, VRBs constituting individual E-PDCCHs are placed in the first slot and the second slot and numbers for identifying the VRBs are also independently assigned. In the described example, $n^{E\text{-}PDCCH}_{VRB}$ is configured independently of $n_{CCE}$. That is, some of the values of $n^{E\text{-}PDCCH}_{VRB}$ overlap possible values of $n_{CCE}$.

Upon detecting a downlink grant in the E-PDCCH region, the terminal 102 reports HARQ response information for downlink transmit data (PDSCH) corresponding to the downlink grant using a PUCCH resource based on the VRB index of the VRB having the lowest VRB index among the VRBs constructing the E-PDCCH containing the downlink grant. Reversely, when assigning an E-PDCCH containing a downlink grant, the base station 101 assigns the E-PDCCH in the VRB corresponding to the PUCCH resource in which the terminal 102 will report HARQ response information for the downlink transmit data (PDSCH) corresponding to the downlink grant. The base station 101 also receives the HARQ response information corresponding to the PDSCH sent to the terminal 102 via the PUCCH which it has scheduled. More specifically, as shown in FIG. 14, a PUCCH resource that has an index $n_{PUCCH}$ equal to the sum of the VRB number $n^{E\text{-}PDCCH}_{VRB}$ of the first VRB among the VRBs that constitute the E-PDCCH containing a downlink grant and cell specific parameter $N_1$ represents the PUCCH resource assigned for HARQ response information of downlink transmit data corresponding to the downlink grant. Since VRB index $n^{E\text{-}PDCCH}_{VRB}$ for VRBs in the E-PDCCH region and CCE index $n_{CCE}$ for CCEs in the PDCCH region are independently assigned as mentioned above, when assigning one or more PDCCHs and one or more E-PDCCHs in the same subframe or assigning two or more E-PDCCHs in the same subframe, the base station 101 carries out scheduling of downlink grant assignment in CCEs or VRBs such that the CCE number $n_{CCE}$ or $n^{E\text{-}PDCCH}_{CCE}$ of the first CCE of each PDCCH or E-PDCCH and the VRB number $n^{E\text{-}PDCCH}_{VRB}$ of the first VRB of each E-PDCCH are all different numbers.

When multiple PUCCH resources are required for one E-PDCCH, the PUCCH resource corresponding to the VRB index of the VRB having the lowest VRB index among the VRBs constructing the E-PDCCH containing the downlink grant and the PUCCH resource having an index larger than that PUCCH resource by one are used. More specifically, as shown in FIG. 14, the PUCCH resource having index $n_{PUCCH}$ equal to the sum of the VRB number $n^{E-PDCCH}_{VRB}$ of the first VRB among the VRBs that constitute the E-PDCCH containing a downlink grant and cell specific parameter $N_1$, and the PUCCH resource having index $n_{PUCCH}$ equal to the sum of the VRB number $n^{E-PDCCH}_{VRB}$ of the first VRB, one, and the cell specific parameter $N_1$ represent the PUCCH resources assigned to HARQ response information for downlink transmit data corresponding to the downlink grant. If multiple PUCCH resources are required, PUCCH resources having indices which are larger by one may be used in a similar manner.

Figure 15:
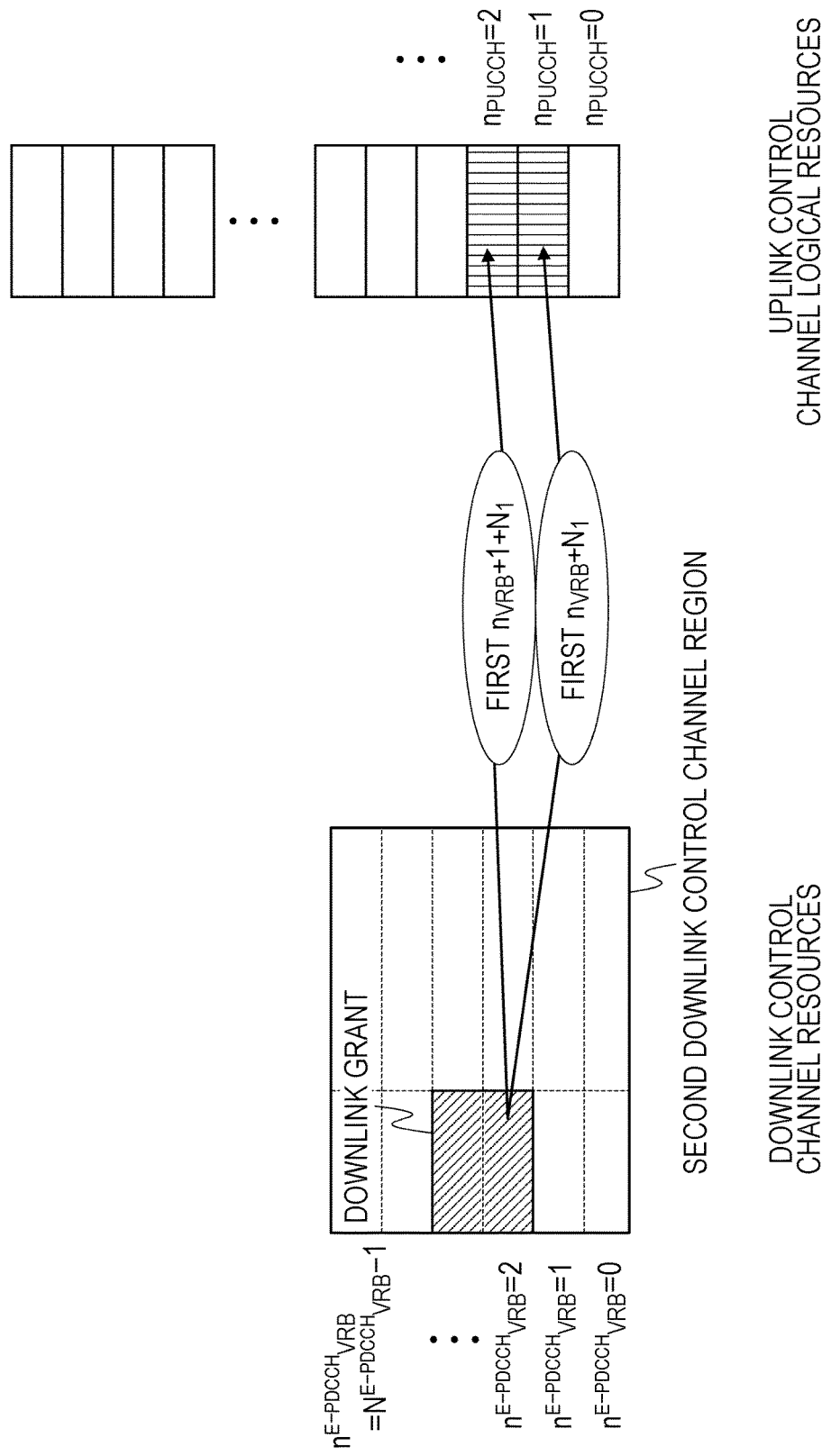
FIG. 15 illustrates the structure of E-PDCCH and assignment of PUCCH resources in the first embodiment.

While FIG. 14 describes re-assignment of $n^{E-PDCCH}_{VRB}$ starting from 0, $n^{E-PDCCH}_{VRB}$ may be $n_{VRB}$ itself originally assigned to VRBs. Alternatively, re-assigned $n^{E-PDCCH}_{VRB}$ may be used in blind decoding of a VRB set while $n_{VRB}$ may be used for associating PUCCH resources as shown in FIG. 15. Mapping from an E-PDCCH resource to a PUCCH resource may use a similar mapping scheme to the one described with FIG. 14 just with replacement of $n^{E-PDCCH}_{VRB}$ with $n_{VRB}$.

The foregoing description showed a mapping scheme in which a PUCCH resource is uniquely determined from configuring parameters for the E-PDCCH region, dynamic E-PDCCH resources, and a cell specific parameter for mapping from an E-PDCCH resource to a PUCCH resource. Next, a mapping scheme which determines a PUCCH resource based on a terminal specific parameter will be described.

Figure 16:
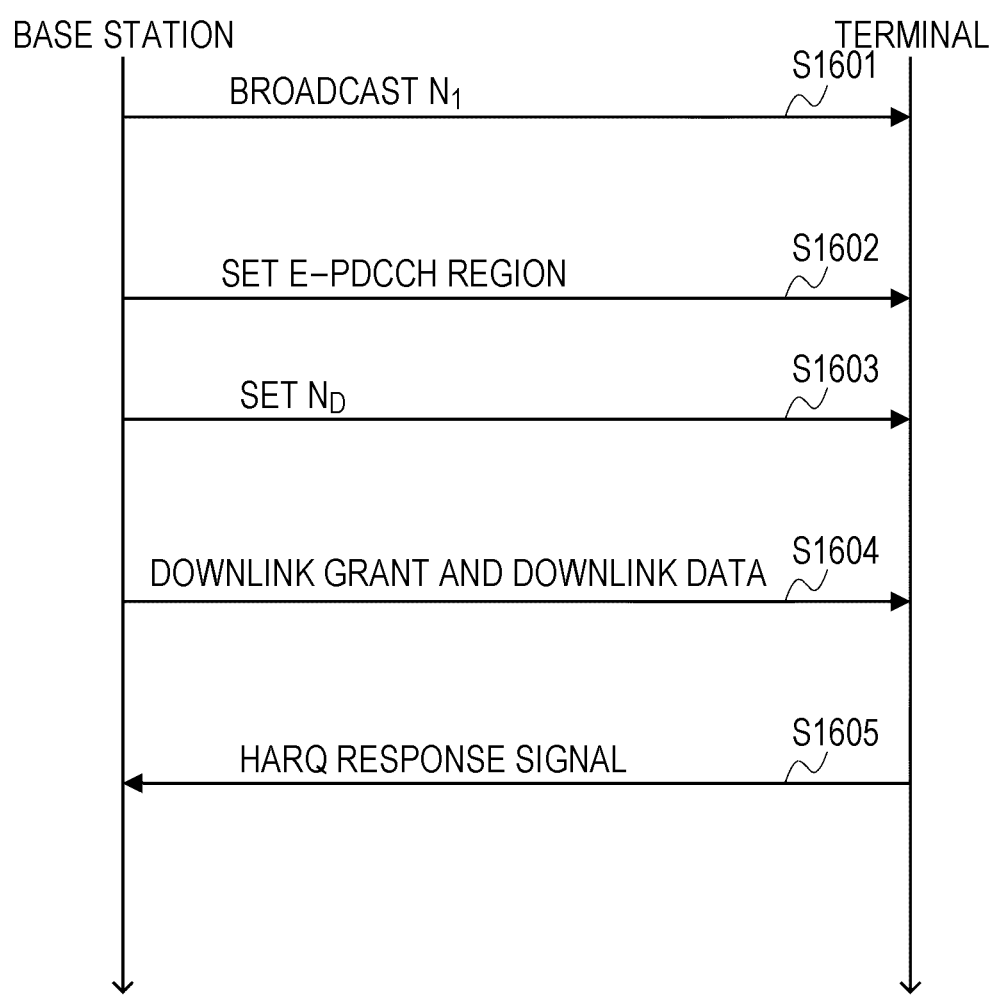
FIG. 16 shows the flow of a downlink data transmission and response procedure between the base station and the terminal according to the first embodiment.

FIG. 16 illustrates the flow of a downlink data transmission and response procedure between the base station 101 and terminal 102. The base station 101 broadcasts a cell specific parameter $N_1$ using a broadcast channel, and the terminal 102 obtains broadcast information (step S1601). $N_1$ indicates the common shift value terminal-commonly configured. Although the base station 101 broadcasts $N_1$ in the illustrated example, this is not limitative. Similar effects may be achieved with notification of $N_1$ via individual signaling (RRC signaling) intended to each terminal 102.

Then, the base station 101 uses RRC signaling to notify the terminal 102 of control information specifying (configuring, indicating) an E-PDCCH region, and the terminal 102 configures an E-PDCCH region based on the control information (step S1602). Here, for specifying the E-PDCCH region, a scheme that indicates some or all of RBs within a frequency band is employed as mentioned above. Alternatively, in combination with the scheme, some subframes in time domain may be specified as subframes in which the E-PDCCH can be placed. For example, a scheme of specifying a subframe interval and an offset from a reference subframe may be used. Alternatively, it is possible to represent in bit map form whether an E-PDCCH can be placed in a radio frame (10 subframes) or subframes in multiple radio frames.

Then, the base station 101 uses RRC signaling to notify the terminal 102 of control information specifying $N_D$, which is a parameter that can be configured specifically for each terminal 102, and the terminal 102 configures $N_D$ based on the control information (step S1603). $N_D$ indicates the individual shift value which is configured specifically for each terminal 102. While the base station 101 configures an E-PDCCH region and thereafter $N_D$ is configured in the illustrated example, this is not limitative. For example, the base station 101 may configure $N_D$ and then the E-PDCCH region, or the E-PDCCH region and $N_D$ may be configured at the same time. Also, the default value of $N_D$ may be configured to zero, in which case when the signaling at step S1603 is not performed (i.e., $N_D$ is not configured), the subsequent process may be continued with $N_D$ assumed to be zero.

Then, using the PDCCH or E-PDCCH, the base station 101 transmits a downlink grant and downlink transmit data corresponding to the downlink grant to the terminal 102, which receives the downlink grant and downlink transmit data (step S1604). After receiving the downlink transmit data, the terminal 102 generates HARQ response information.

Finally, the terminal 102 determines the PUCCH resource based on $N_1$ obtained as per step S1601, E-PDCCH region configuration information obtained as per step S1602, $N_D$ obtained as per step S1603, and resource information for the downlink grant detected at step S1604, and uses the determined PUCCH resource to report HARQ response information (step S1605).

Figure 17:
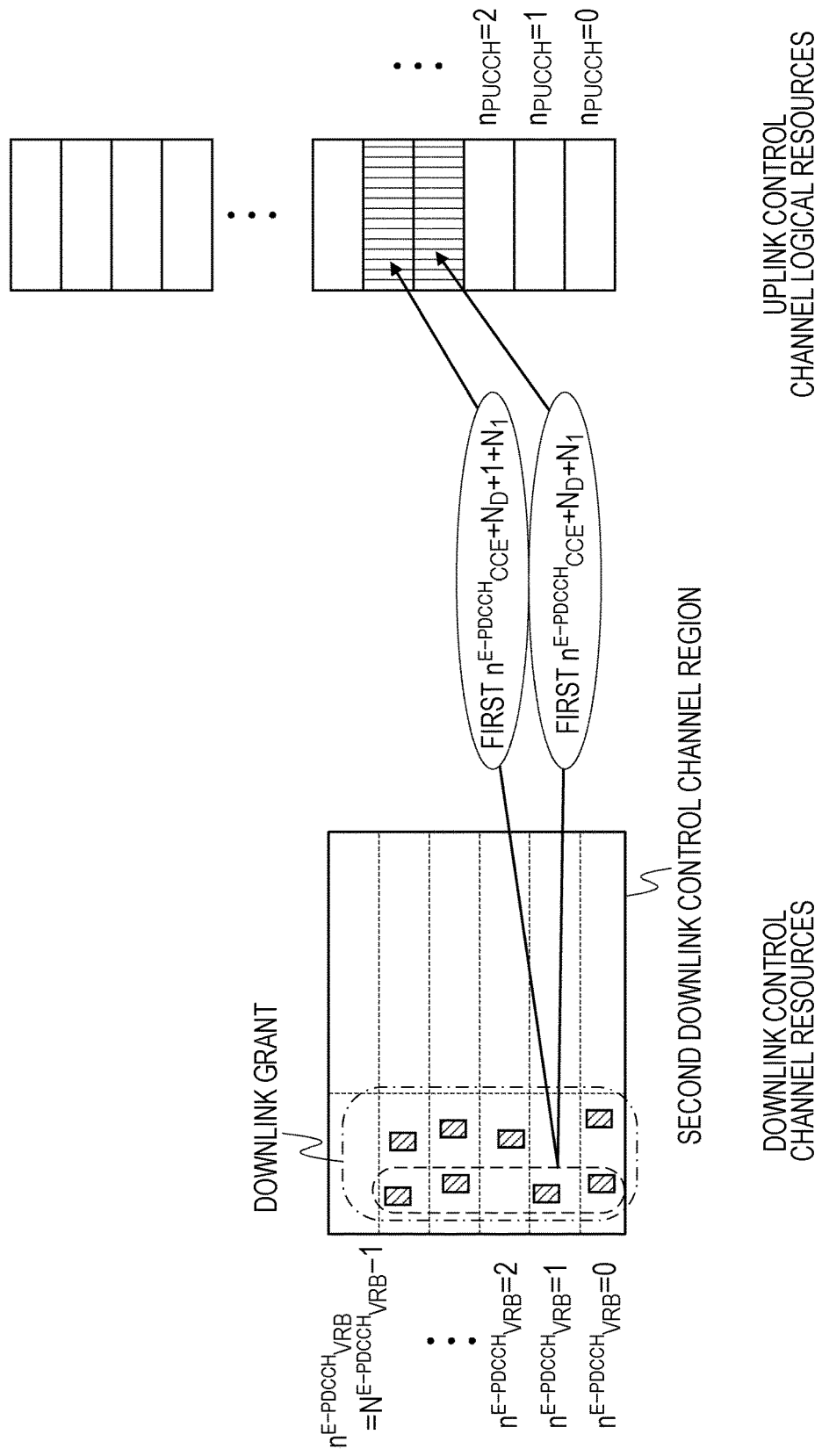
FIG. 17 illustrates the structure of E-PDCCH and assignment of PUCCH resources in the first embodiment.

Next, the E-PDCCH structure and PUCCH resource assignment in this case are described. FIG. 17 shows the structure of E-PDCCH and exemplary assignment of PUCCH resources. Note that the E-PDCCH shown in FIG. 17 represents the E-PDCCH structure and PUCCH resource assignment when cross-interleaving is employed, and the CCE structure and assignment of CCE indices in the E-PDCCH region are similar to FIG. 13.

The PUCCH resource determined by adding $N_D$, a terminal-specific parameter, to the CCE number $n^{E-PDCCH}_{CCE}$ of the first CCE among the CCEs that constitute the E-PDCCH containing the downlink grant is used. More specifically, as shown in FIG. 17, the PUCCH resource that has index $n_{PUCCH}$ equal to the sum of the CCE number $n^{E-PDCCH}_{CCE}$ of the first CCE among the CCEs that constitute the E-PDCCH containing the downlink grant, the terminal specific parameter $N_D$, and the cell specific parameter $N_1$ represents the PUCCH resource assigned for HARQ response information of downlink transmit data corresponding to the downlink grant. While CCE index $n^{E-PDCCH}_{CCE}$ for CCEs in the E-PDCCH region and CCE index $n_{CCE}$ for CCEs in the PDCCH region are independently assigned as mentioned above, even if there is an overlap between $n_{CCE}$ and $n^{E-PDCCH}_{CCE}$, resources are shifted by $N_D$, which is a terminal specific parameter, in the cases of FIGS. 12 and 17. This can avoid overlap of PUCCH resources without involving complicated scheduling. In addition, because resources can be shifted by $N_D$ individually for each terminal 102, complexity of E-PDCCH scheduling can be reduced even when E-PDCCH is transmitted to multiple terminals 102 in separate E-PDCCH regions in the same subframe. In other words, because PUCCH resources corresponding to smaller CCE indices are used when the elements constituting an E-PDCCH in the E-PDCCH region are re-numbered, the problem of being subject to PUCCH resource collisions can be resolved and the probability of PUCCH resource collisions can be reduced. If multiple PUCCH resources are required, PUCCH resources having indices which are larger by one may be used.

Figure 18:
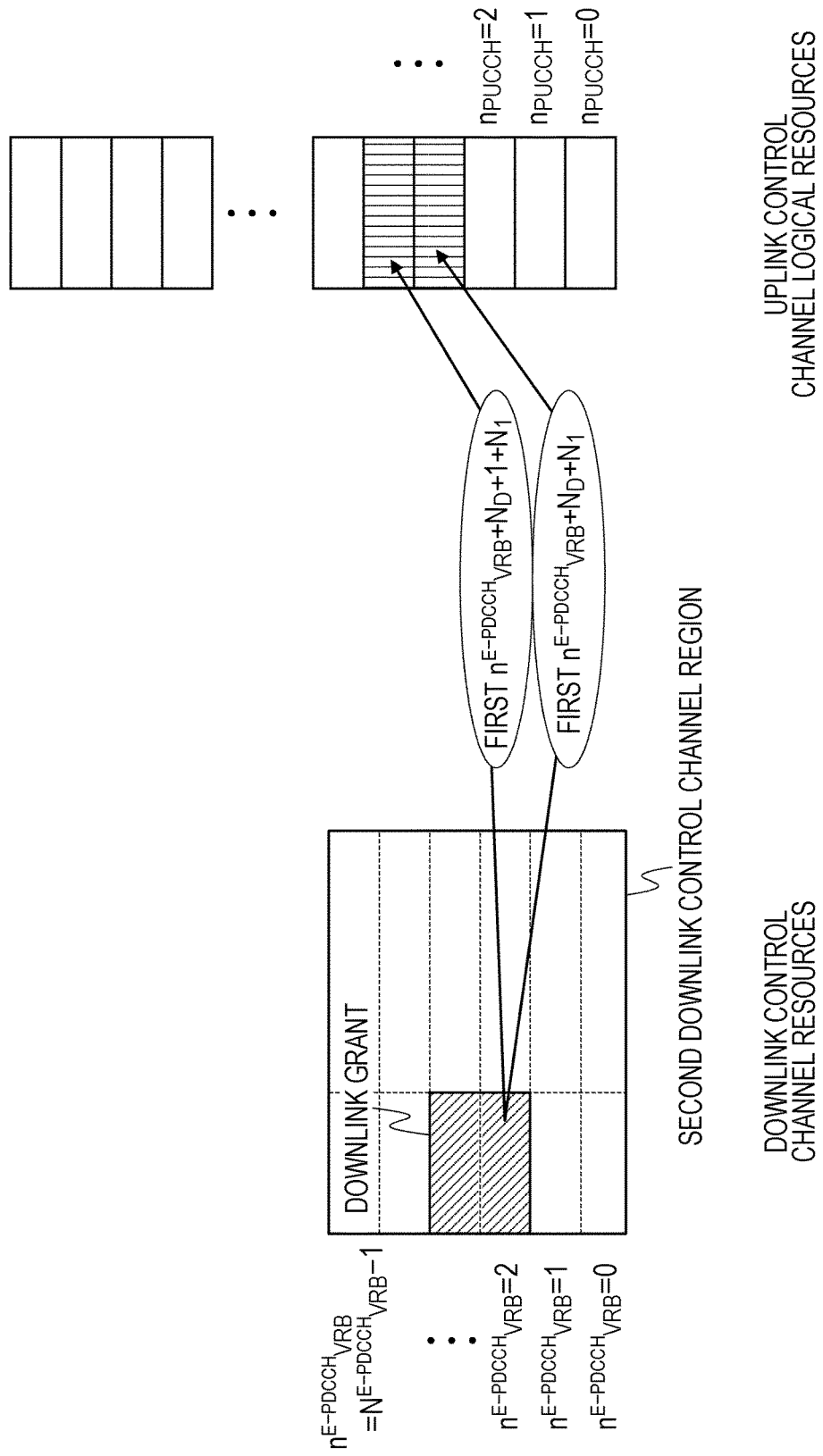
FIG. 18 illustrates the structure of E-PDCCH and assignment of PUCCH resources in the first embodiment.

Next, another example of E-PDCCH structure and PUCCH resource assignment in this case is described. FIG. 18 shows an example of E-PDCCH structure and assignment of PUCCH resources. Note that the E-PDCCH shown in FIG. 18 represents the E-PDCCH structure and PUCCH resource assignment when cross-interleaving is not employed, and the VRB structure and assignment of VRB index in the E-PDCCH region are similar to FIG. 14.

As illustrated in FIG. 18, the PUCCH resource having index $n_{PUCCH}$ that equals the sum of the VRB number $n^{E\text{-}PDCCH}{}_{VRB}$ of the first VRB among the VRBs constituting the E-PDCCH containing the downlink grant, the terminal specific parameter $N_D$, and the cell specific parameter $N_1$ represents the PUCCH resource assigned to HARQ response information for downlink transmit data corresponding to the downlink grant. While VRB index $n^{E\text{-}PDCCH}{}_{VRB}$ for VRBs in the E-PDCCH region and CCE index $n_{CCE}$ for CCEs in the PDCCH region are independently assigned as mentioned above, even if there is an overlap between $n_{CCE}$ and $n^{E\text{-}PDCCH}{}_{VRB}$, resources are shifted by $N_D$, which is a terminal specific parameter, in the cases of FIGS. 12 and 18. This achieves similar effects to the cross-interleaving case described in FIG. 17.

Figure 19:
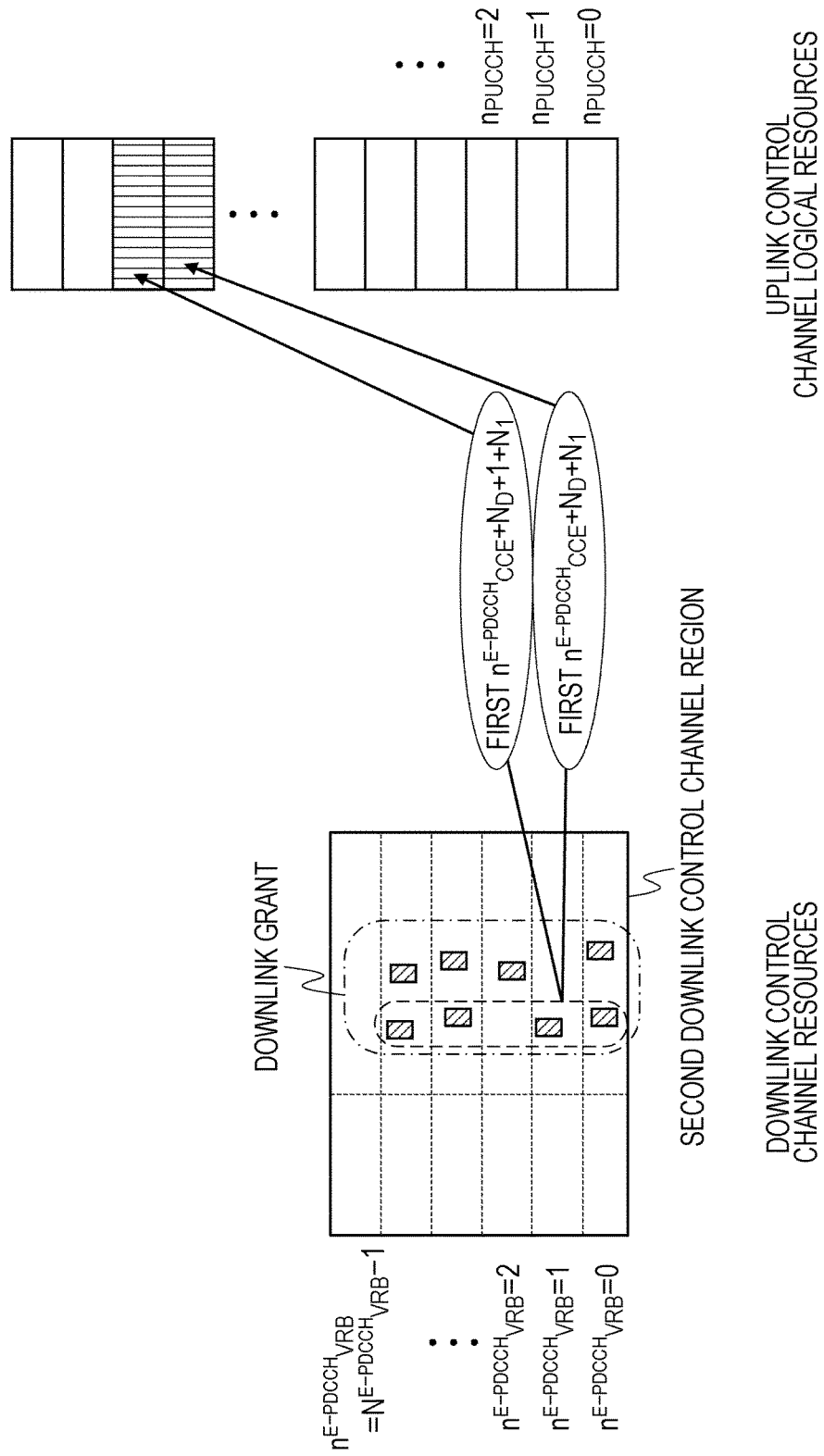
FIG. 19 illustrates the structure of E-PDCCH and assignment of PUCCH resources in the first embodiment.

Next, the E-PDCCH structure and PUCCH resource assignment with the downlink grant placed in the second slot will be described. FIG. 19 shows an example of the E-PDCCH structure and assignment of PUCCH resources. Note that the E-PDCCH shown in FIG. 19 represents the E-PDCCH structure and PUCCH resource assignment when cross-interleaving is employed, where the CCE structure and assignment of CCE index in the E-PDCCH region are similar to FIG. 13 or 17 except for slots.

As illustrated in FIG. 19, like FIG. 17, the PUCCH resource that has index $n_{PUCCH}$ equal to the sum of the CCE number $n^{E\text{-}PDCCH}{}_{CCE}$ of the first CCE among the CCEs that constitute the E-PDCCH containing a downlink grant, the terminal specific parameter $N_D$, and the cell specific parameter $N_1$ represents the PUCCH resource assigned to HARQ response information for downlink transmit data corresponding to the downlink grant. Consequently, also in the case of E-PDCCH placement in the second slot, overlap of PUCCH resources is prevented due to shift by $N_D$ terminal-specifically configured even if an E-PDCCH placed in the first slot addressed to other terminal and the CCE number $n^{E\text{-}PDCCH}{}_{CCE}$ of the first CCE are the same.

Figure 20:
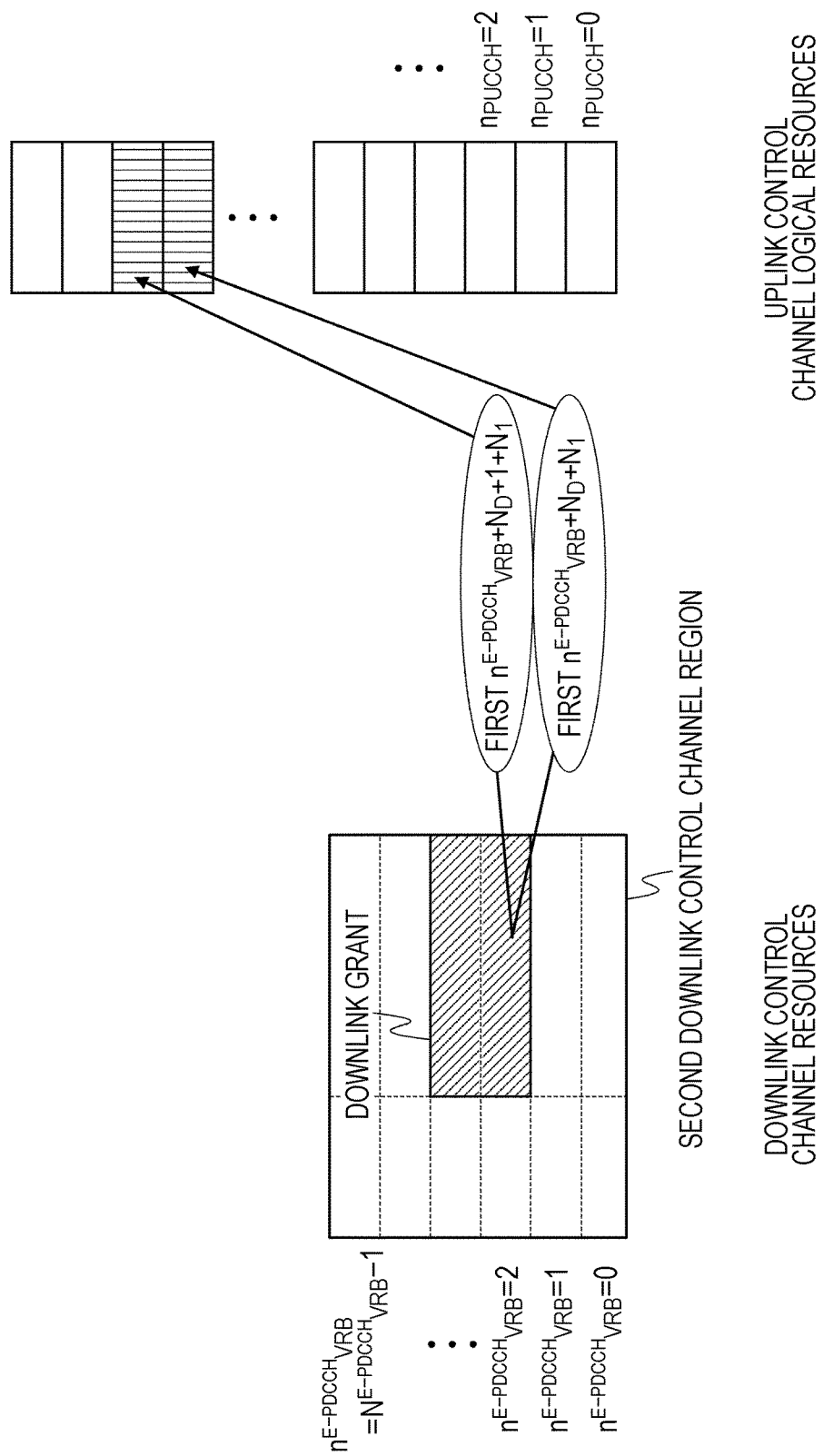
FIG. 20 illustrates the structure of E-PDCCH and assignment of PUCCH resources in the first embodiment.

Much the same applies to a no cross-interleaving case. FIG. 20 shows an example of the E-PDCCH structure and assignment of PUCCH resources. Note that the E-PDCCH shown in FIG. 20 represents the E-PDCCH structure and PUCCH resource assignment when cross-interleaving is employed, where the VRB structure and assignment of VRB index in the E-PDCCH region are similar to FIG. 14 or 18 except for slots.

As shown in FIG. 20, like FIG. 18, the PUCCH resource that has index $n_{PUCCH}$ equal to the sum of the VRB number $n^{E\text{-}PDCCH}{}_{VRB}$ of the first VRB among the VRBs that constitute the E-PDCCH containing a downlink grant, the terminal specific parameter $N_D$, and the cell specific parameter $N_1$ represents the PUCCH resource assigned to HARQ response information for downlink transmit data corresponding to the downlink grant. Consequently, also in the case of E-PDCCH placement in the second slot, overlap of PUCCH resources is prevented due to shift by $N_D$ configured for each terminal even if an E-PDCCH placed in the first slot addressed to other terminal and the VRB number $n^{E\text{-}PDCCH}{}_{VRB}$ of the first VRB are the same. While assignment of VRB index $n^{E\text{-}PDCCH}{}_{VRB}$ is shown above, similar effects can be achieved by introducing the terminal specific parameter $N_D$ also in a case where $n_{VRB}$ is instead used for identification.

While the above description assumes that a downlink grant can be placed in the second slot, this is not limitative. For example, the downlink grant may be configured to be usually placed in the first slot only and may be enabled to be placed also in the second slot if certain control information is configured such as via RRC signaling. Alternatively, the terminal 102 may provide the base station 101 with terminal capability information showing whether the terminal 102 supports reception of a downlink grant in the second slot or not, and a downlink grant may be sent in the second slot only to terminals 102 that support reception of downlink grant in the second slot. This optimizes flexibility in E-PDCCH scheduling in accordance with delay time from detection of a downlink grant to detection of downlink data and transmission of response information.

As described, when transmitting downlink transmit data in relation to a downlink grant in a E-PDCCH region, the base station 101 assigns the downlink grant to a E-PDCCH resource that corresponds to the uplink control channel resource that will be used for reporting HARQ response information corresponding to the downlink transmit data. Preferably, the base station 101 adds a specified value to the index of the element having the lowest index among the elements constructing the E-PDCCH resource. The PUCCH resource having an index equal to the sum is the PUCCH resource corresponding to the E-PDCCH resource. The base station 101 then monitors this uplink control channel resource to extract HARQ response information.

If the terminal 102 detects a downlink grant in the E-PDCCH region, it reports HARQ response information for downlink transmit data associated with the downlink grant using a PUCCH resource corresponding to the E-PDCCH resource in which the downlink grant was detected.

In other words, the base station 101 sends the terminal 102 an E-PDCCH placed in a PDSCH region. The terminal 102 then monitors the PDCCH placed in the PDCCH region and an E-PDCCH placed in a PDSCH different from the PDCCH region. If the terminal 102 detects an E-PDCCH, it extracts transmit data on the PDSCH associated with the detected E-PDCCH, generates response information for the extracted transmit data, and generates a PUCCH by mapping the response information to the PUCCH resource corresponding to the E-PDCCH resource in which the E-PDCCH was detected, and reports the response information to the base station 101. The base station 101 extracts the PUCCH to which the response information for the transmit data on the PDSCH associated with the E-PDCCH is mapped, from the PUCCH resource corresponding to the E-PDCCH resource in which the E-PDCCH was placed.

This allows an uplink control channel to be dynamically allocated to the terminal even when a downlink grant is transmitted and received using an E-PDCCH. Consequently, uplink control channels can be utilized efficiently.

The base station 101 also explicitly notifies each terminal 102 of a parameter for shifting PUCCH resources and the terminal 102 determines the PUCCH resource in consideration of the notified parameter. Preferably, the parameter is added to the lowest index of the elements constructing an E-PDCCH resource.

In other words, the base station 101 notifies the terminal 102 of control information including a parameter indicating the individual shift value configured individually for each terminal 102. The terminal 102 receives the control information containing the individual shift parameter, and maps response information to the PUCCH resource which is determined by adding the individual shift value to the E-PDCCH resource index to generate a PUCCH. The base station 101 extracts the PUCCH from the PUCCH resource determined by adding the individual shift value to the E-PDCCH resource index to obtain response information.

This facilitates avoidance of overlap of uplink control channels among terminals in dynamic assignment of uplink control channels to the terminal 102 in a scenario where the base station 101 and the terminal 102 transmit and receive downlink grants using E-PDCCH. E-PDCCH or PDCCH thus can be efficiently used.

When cross-interleaving is not employed, if the terminal 102 detects an E-PDCCH containing a downlink grant, it reports HARQ response information via a PUCCH resource having index $n_{PUCCH}$ determined from the VRB number $n^{E-PDCCH}_{VRB}$ of the first VRB among the VRBs constituting the E-PDCCH containing the downlink grant. If the terminal 102 detects a PDCCH containing a downlink grant, it reports HARQ response information via a PUCCH resource having index $n_{PUCCH}$ determined from the CCE number $n_{CCE}$ of the first CCE among the CCEs constituting the PDCCH containing the downlink grant.

When cross-interleaving is employed, upon detecting an E-PDCCH containing a downlink grant, the terminal 102 reports HARQ response information via a PUCCH resource having index $n_{PUCCH}$ determined from the CCE number $n^{E-PDCCH}_{CCE}$ of the first CCE among the CCEs constituting the E-PDCCH containing the downlink grant. If the terminal 102 detects a PDCCH containing a downlink grant, it reports HARQ response information via a PUCCH resource having index $n_{PUCCH}$ determined from the CCE number $n_{CCE}$ of the first CCE among the CCEs constituting the PDCCH containing the downlink grant.

Consequently, PUCCH resources corresponding to E-PDCCH and PUCCH resources corresponding to PDCCH can be shared. It is therefore not necessary to define a new PUCCH resource for E-PDCCH, which reduces processing at the terminal and the base station.

Second Embodiment

The first embodiment described above showed explicit signaling of a shift (offset) value for PUCCH resources. In the second embodiment of the invention described below, a shift (offset) value for PUCCH resources is implicitly/tacitly specified. The communications system in this embodiment can employ a similar configuration to the communications system shown in FIG. 1. The configurations of the base station 101 and terminal 102 in this embodiment may be similar to the functional blocks shown in FIGS. 4 and 5.

Figures 21, 22:
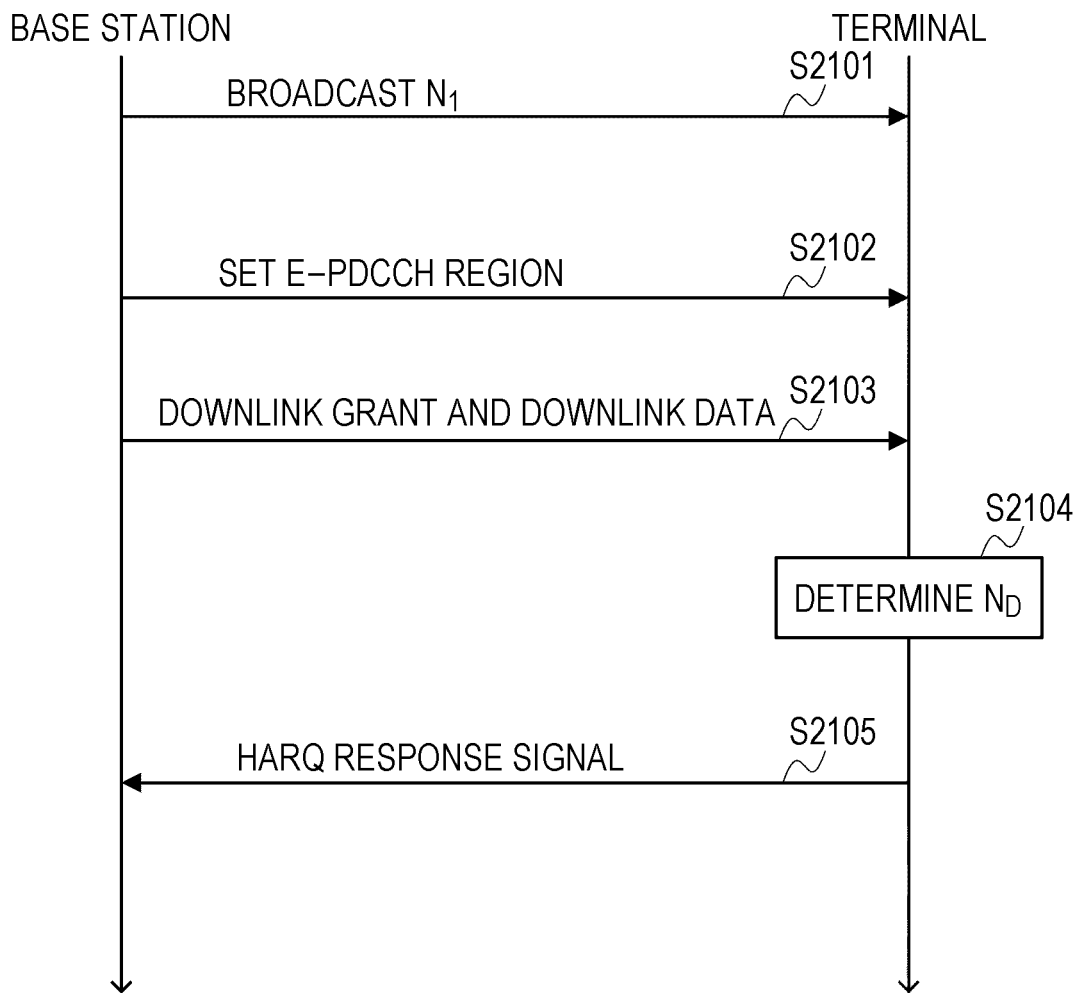
FIG. 21 shows the flow of a downlink data transmission and response procedure between the base station and the terminal according to a second embodiment of the invention.
FIG. 22 is a table showing correspondence between slots and the shift value in the second embodiment.

FIG. 21 shows the flow of a downlink data transmission and response procedure between the base station 101 and the terminal 102. The base station 101 broadcasts $N_1$, a cell specific parameter, using a broadcast channel, and the terminal 102 obtains broadcast information (step S2101). While the base station 101 broadcasts $N_1$ in the illustrated example, this is not limitative. Similar effects may be achieved by the base station 101 notifying $N_1$ via individual signaling (RRC signaling) addressed to each terminal, for example.

The base station 101 then uses RRC signaling to notify the terminal 102 of control information specifying an E-PDCCH region, and the terminal 102 configures an E-PDCCH region based on the control information (step S2102).

Then, using the PDCCH or E-PDCCH, the base station 101 transmits a downlink grant and downlink transmit data corresponding to the downlink grant to the terminal, and the terminal 102 receives the downlink grant and downlink transmit data (step S2103).

The terminal 102 then uses a predetermined method to determine $N_D$ according to information configured for each terminal 102 (step S2104).

Finally, the terminal 102 determines the PUCCH resource based on $N_1$ obtained as per step S2101, E-PDCCH region configuration information obtained as per step S2102, resource information for the downlink grant detected at step S2103, and $N_D$ determined as per step S2104, and uses the determined PUCCH resource to report HARQ response information (step S2105).

At step 2104, $N_D$ may be determined with such methods as follows.

(1) $N_D$ is determined from configuration information for E-PDCCH region obtained at step S2102. For example, $N_D$ is calculated using the VRB index of the VRB having the lowest VRB index $n_{VRB}$ among the VRBs constructing the E-PDCCH region. Alternatively, the VRB index itself may be used as $N_D$.

(2) $N_D$ is determined from SS configuration for monitoring downlink grants used at step 2103. For example, as shown in FIG. 22, if the E-PDCCH is detected in the first slot, the $N_D$ value is configured to A (a predetermined value); if the E-PDCCH is detected in the second slot, the $N_D$ value is configured to B (a predetermined value) which is different from A. Alternatively, in a case of an MIMO-multiplexed E-PDCCH, $N_D$ corresponding to the index of the layer (transmission port) to which the E-PDCCH is assigned may be used.

(3) $N_D$ is determined from other configuration information configured specifically for the terminal. For example, an ID assigned to the terminal may be used to calculate $N_D$. For instance, $N_D$ may be calculated using an ID assigned to the terminal and $N_{CCE}$ or a cell specific parameter specified by the base station, or by performing remainder calculation on the ID. Alternatively, a value that is associated with the transmission port or scramble code ID used for downlink data transmission in advance may be used.

As described, the base station 101 implicitly/tacitly notifies each terminal 102 of a parameter for shifting PUCCH resources and the terminal 102 determines the PUCCH resource in consideration of the parameter. Preferably, the parameter is added to the lowest index of the elements constructing the E-PDCCH resource.

This facilitates avoidance of overlap of uplink control channels among terminals in dynamic assignment of uplink control channels to the terminal 102 in a scenario where the base station 101 and the terminal 102 transmit and receive downlink grants using E-PDCCH. E-PDCCH or PDCCH thus can be efficiently used.

Third Embodiment

The first embodiment described above showed semi-static signaling of a shift (offset) value for PUCCH resources. In the third embodiment of the invention described below, a shift (offset) value for PUCCH resources is dynamically indicated. The communications system in this embodiment can employ a similar configuration to the communication system shown in FIG. 1. The configurations of the base station 101 and terminal 102 in this embodiment may be similar to the functional blocks shown in FIGS. 4 and 5.

Figures 23, 24:
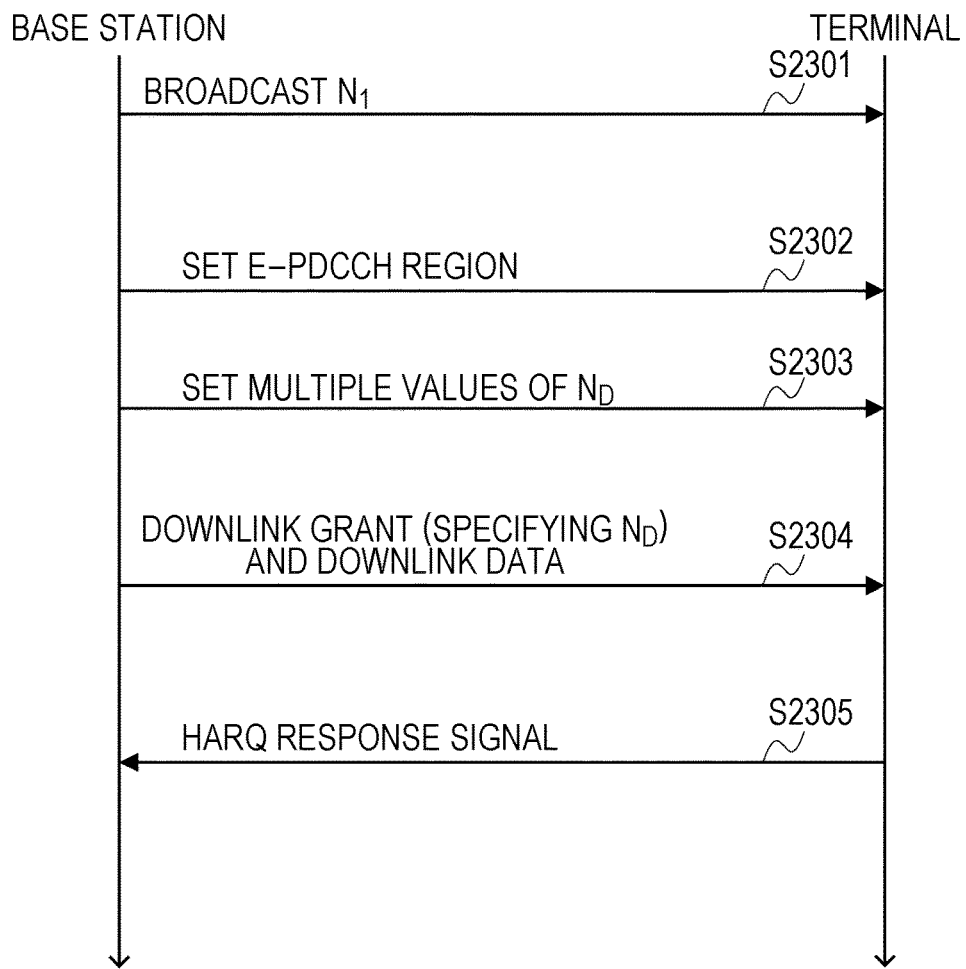
FIG. 23 shows the flow of a downlink data transmission and response procedure between the base station and the terminal according to a third embodiment of the invention.
FIG. 24 is a table showing correspondence between indices and the shift value in the third embodiment.
Figure 25:
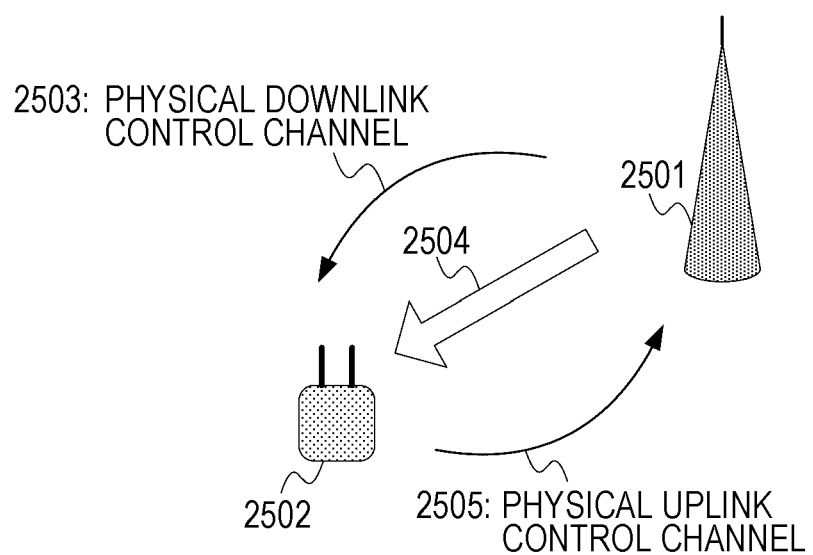
FIG. 25 shows an exemplary configuration of a communications system.

FIG. 23 shows the flow of a downlink data transmission and response procedure between the base station 101 and the terminal 102. The base station 101 broadcasts cell specific parameter $N_1$ using a broadcast channel and the terminal 102 obtains broadcast information (step S2301). Although the base station 101 broadcasts $N_1$ in the illustrated example, this is not limitative. Similar effects may be achieved by the base station 101 notifying $N_1$ via individual signaling (RRC signaling) intended to each terminal 102, for example.

Then, the base station 101 uses RRC signaling to notify the terminal 102 of control information indicating an E-PDCCH region, and the terminal 102 configures an E-PDCCH region according to the control information (step S2302).

The base station 101 then uses RRC signaling to notify the terminal 102 of control information indicating multiple values of $N_D$, and the terminal 102 configures multiple $N_D$ values according to the control information (step S2303).

The base station 101 then sends a downlink grant and downlink transmit data corresponding to the downlink grant, using a PDCCH or E-PDCCH, to the terminal 102, which receives the downlink grant and downlink transmit data (step S2304). The downlink grant contains information indicating which one of the multiple $N_D$ values should be used.

Finally, the terminal 102 determines the PUCCH resource based on $N_1$ obtained as per step S2301, E-PDCCH region configuration information obtained as per step S2302, downlink grant resource information detected as per step S2304, and $N_D$ indicated as per steps S2303 and S2304, and uses the determined PUCCH resource to report HARQ response information (step S2305).

As a way to configure the multiple $N_D$ values at step 2303, the number of $N_D$ values is predetermined as shown in FIG. 24 and the $N_D$ value corresponding to each index is notified. In the example of FIG. 24, there are four different $N_D$ values; any of four values A, B, C, and D is notified. The downlink grant at step S2304 has an information field in which an index specifying $N_D$ is indicated, and $N_D$ can be determined by extracting the value of the information field. At step 2303, it is not necessary to configure all of the multiple $N_D$ values. For example, some of the values may be designated as fixed values (e.g., zero).

As shown above, the base station 101 dynamically indicates a parameter for shifting PUCCH resources for each terminal 102, and the terminal 102 determines the PUCCH resource in consideration of the indicated parameter. Preferably, the parameter is added to the lowest index of the elements constructing an E-PDCCH resource.

This facilitates avoidance of overlap of uplink control channels among terminals 102 in dynamic assignment of uplink control channels to the terminal 102 in a scenario where the base station 101 and the terminal 102 transmit and receive downlink grants using E-PDCCH. E-PDCCH or PDCCH thus can be efficiently used.

The first embodiment showed semi-static and explicit notification of $N_D$, the second embodiment showed implicit/tacit notification of $N_D$, and the third embodiment showed dynamic and explicit notification of $N_D$. These schemes may also be used in combination. For example, a formula to determine an $N_D$ value may be predefined, and a parameter which is semi-statically and explicitly indicated, a parameter which is implicitly/tacitly indicated, and/or a parameter which is dynamically and explicitly indicated may be introduced as an element (or a term) of the formula. Alternatively, the PDCCH resource may also be determined by adding the multiple $N_D$ values to an E-PDCCH resource index.

While the above described embodiments use resource elements and resource blocks as the units of mapping data channels, control channels, PDSCH, PDCCH, and reference signals, and use subframe and radio frame as the units of transmission in temporal direction, they are not limitative. Similar effects can be achieved using region and time units represented by certain frequency and time instead.

While an enhanced physical downlink control channel 103 placed in a PDSCH region is referred to as E-PDCCH so that it is clearly distinguished from the conventional physical downlink control channel (PDCCH) in the above described embodiments, this is not limitative. Even where the two types of channel are both called PDCCH, implementing different operations for an enhanced physical downlink control channel placed in a PDSCH region and the conventional physical downlink control channel placed in a PDCCH region is substantially equivalent to the embodiments in which E-PDCCH and PDCCH are distinguished.

While the above described embodiments showed a case where always a single downlink grant is received, this is not limitative. For example, even in a scenario where multiple downlink grants can be received, such as when downlink grants for multiple cells are received at a time, the processes described in the embodiments may be performed for reception of a single downlink grant to attain similar effects.

Programs according to the present invention to run in a base station and a terminal are programs that control a CPU and the like (programs that cause a computer to function) so that the functionality of the embodiments of the invention described above is realized. Information handled in these devices is temporarily saved in random access memory (RAM) during its processing, and then stored in any of various kinds of read-only memory (ROM) and/or a hard disc drive (HDD), from which it is read or modified or written by a CPU as necessary. Recording media for storing the programs may be any of semiconductor media (e.g., ROM, non-volatile memory card), optical recording media (e.g., digital versatile disc (DVD), magneto-optical disc (MO), mini-disc (MD), compact disc (CD), or blu-ray disc (BD)), magnetic recording media (e.g., magnetic tape, flexible disc), and the like. Also, in addition to realizing the functionality of the above described embodiments by execution of a loaded program, the functionality of the present invention can also be realized through cooperative processing with an operating system or other application programs in accordance with instructions from such a program.

For distribution in a market, the programs may be stored and distributed on portable recording media or transferred to a server computer connected via a network such as the Internet. In this case, a storage device of the server computer is also included in the present invention. Also, part or all of the base station and terminal described in the embodiments may be realized by large scale integration (LSI), which is typically an integrated circuit. The functional blocks of the base station and the terminal may be either individually implemented in chips or some or all of them may be integrated into a chip. An integrated circuit may be realized as a special purpose circuit or a general-purpose processor instead of LSI. If an integrated circuitry technology that replaces LSI emerges with progress in semiconductor technology, integrated circuitry based on such a technology could be employed.

While the embodiments of the present invention have been described with reference to the drawings, specific configurations are not limited to the embodiments and design changes within the scope of the invention are also encompassed. Various modifications may be made to the present invention within the scope defined by the claims, and an embodiment practiced by combining appropriate technical means disclosed in different embodiments also falls within the technical scope of the invention. An arrangement in which elements described in the embodiments and having similar effects are interchanged is also encompassed.

INDUSTRIAL APPLICABILITY

The present invention is advantageous for application to a wireless base station device, wireless terminal device, wireless communications system, and/or a wireless communication method.

REFERENCE SIGNS LIST 101 base station
102 terminal
103 enhanced physical downlink control channel
104 downlink transmit data
105 physical uplink control channel
401 codeword generating unit
402 downlink subframe generating unit
403 physical downlink control channel generating unit
404 OFDM signal transmitting unit
405, 511 transmit antenna
406, 501 receive antenna
407 SC-FDMA signal receiving unit
408 uplink subframe processing unit
409 physical uplink control channel extracting unit
410, 506 higher layer
502 OFDM signal receiving unit
503 downlink subframe processing unit
504 physical downlink control channel extracting unit
505 codeword extracting unit
507 response information generating unit
508 uplink subframe generating unit
509 physical uplink control channel generating unit
510 SC-FDMA signal transmitting unit
2501 base station
2502 terminal
2503 physical downlink control channel
2504 downlink transmit data
2505 physical uplink control channel

The invention claimed is:

1. A terminal apparatus that is configured to and/or programmed to communicate with a base station apparatus, the terminal apparatus comprising:
a downlink control channel detector configured to and/or programmed to detect an Enhanced Physical Downlink Control Channel (EPDCCH), and
a response transmitter configured to and/or programmed to transmit Hybrid Automatic Repeat reQuest (HARQ) response information using a first Physical Uplink Control Channel (PUCCH) resource for a Physical Downlink Shared Channel (PDSCH) transmission indicated by a detection of the EPDCCH, wherein
the first PUCCH resource is determined on the basis of at least a lowest element index used to construct the EPDCCH and a first value which is a PUCCH resource offset and is determined, within a plurality of values, from a field in downlink control information of the EPDCCH;
the field includes an index specifying the PUCCH resource offset; and
the first PUCCH resource is determined further on the basis of at least a second value which is configured by a dedicated Radio Resource Control (RRC) signal.

2. The terminal apparatus according to claim 1, wherein the first PUCCH resource is determined further on the basis of at least a third value which is determined from an antenna port used for the EPDCCH transmission.

3. The terminal apparatus according to claim 1, wherein the downlink control channel detector is further configured to and/or programmed to detect a Physical Downlink Control Channel (PDCCH), and
the response transmitter is further configured to and/or programmed to transmit HARQ response information using a second PUCCH resource for a PDSCH transmission indicated by a detection of the PDCCH,
the second PUCCH resource being determined on the basis of at least a lowest element index used to construct the PDCCH and a fourth value which is common in a cell.

4. The terminal apparatus according to claim 1, wherein the lowest element index used to construct the EPDCCH is an index of an initial element among one or a plurality of elements used to construct the EPDCCH.

5. A base station apparatus that is configured to and/or programmed to communicate with a terminal apparatus, the base station apparatus comprising:
a physical control information notifier configured to and/or programmed to transmit an Enhanced Physical Downlink Control Channel (EPDCCH), and
a response information receiver configured to and/or programmed to receive Hybrid Automatic Repeat reQuest (HARQ) response information using a first Physical Uplink Control Channel (PUCCH) resource for a Physical Downlink Shared Channel (PDSCH) transmission associated with the EPDCCH, wherein
the first PUCCH resource is determined on the basis of at least a lowest element index used to construct the EPDCCH and a first value which is a PUCCH resource offset and is determined, within a plurality of values, from a field in downlink control information of the EPDCCH;
the field includes an index specifying the PUCCH resource offset; and
the first PUCCH resource is determined further on the basis of at least a second value which is configured by a dedicated Radio Resource Control (RRC) signal.

6. The base station apparatus according to claim 5, wherein
the first PUCCH resource is determined further on the basis of at least a third value which is determined from an antenna port used for the EPDCCH transmission.

7. The base station apparatus according to claim 5, wherein
the physical control information notifier is further configured to and/or programmed to transmit a Physical Downlink Control Channel (PDCCH), and
the response information receiver is further configured to and/or programmed to receive HARQ response information using a second PUCCH resource for a PDSCH transmission associated with the PDCCH,
the second PUCCH resource being determined on the basis of at least a lowest element index used to construct the PDCCH and a fourth value which is common in a cell.

8. The base station apparatus according to claim 5, wherein
the lowest element index used to construct the EPDCCH is an index of an initial element among one or a plurality of elements used to construct the EPDCCH.

9. A communication method used by a terminal apparatus that is configured to and/or programmed to communicate with a base station apparatus, the communication method comprising:
detecting an Enhanced Physical Downlink Control Channel (EPDCCH), and transmitting Hybrid Automatic Repeat reQuest (HARQ) response information using a first Physical Uplink Control Channel (PUCCH) resource for a Physical Downlink Shared Channel (PDSCH) transmission indicated by a detection of the EPDCCH, wherein the first PUCCH resource is determined on the basis of at least a lowest element index used to construct the EPDCCH and a first value which is a PUCCH resource offset and is determined, within a plurality of values, from a field in downlink control information of the EPDCCH;

the field includes an index specifying the PUCCH resource offset; and the first PUCCH resource is determined further on the basis of at least a second value which is configured by a dedicated Radio Resource Control (RRC) signal.

10. A communication method used by a base station apparatus that is configured to and/or programmed to communicate with a terminal apparatus, the communication method comprising:

transmitting an Enhanced Physical Downlink Control Channel (EPDCCH), and receiving Hybrid Automatic Repeat reQuest (HARQ) response information using a first Physical Uplink Control Channel (PUCCH) resource for a Physical Downlink Shared Channel (PDSCH) transmission associated with the EPDCCH, wherein the first PUCCH resource is determined on the basis of at least a lowest element index used to construct the EPDCCH and a first value which is a PUCCH resource offset and is determined, within a plurality of values, from a field in downlink control information of the EPDCCH;

the field includes an index specifying the PUCCH resource offset; and the first PUCCH resource is determined further on the basis of at least a second value which is configured by a dedicated Radio Resource Control (RRC) signal.

* * * * *